(12) United States Patent
Simpson et al.

(10) Patent No.: US 12,330,794 B2
(45) Date of Patent: Jun. 17, 2025

(54) SEATING APPARATUS COMPRISING A LEG REST TRACK AND FOLLOWER

(71) Applicant: IPECO HOLDINGS LIMITED, Southend on Sea (GB)

(72) Inventors: Nicole Simpson, Canvey Island Essex (GB); Jean Evans, Rettendon (GB); Jeremy Smith, Stock Essex (GB); Brian Ward, Noak Bridge (GB); Anthony Harcup, Virginia Water Surrey (GB); Richard Peter John Nicholas, London (GB); Brad Becker, Derby, KS (US)

(73) Assignee: Ipeco Holdings Limited, Essex (GB)

( * ) Notice: Subject to any disclaimer, the term of this patent is extended or adjusted under 35 U.S.C. 154(b) by 0 days.

(21) Appl. No.: 18/142,186

(22) Filed: May 2, 2023

(65) Prior Publication Data

US 2023/0348066 A1 Nov. 2, 2023

Related U.S. Application Data

(63) Continuation of application No. 16/498,806, filed as application No. PCT/GB2018/050900 on Mar. 29, 2018, now Pat. No. 11,673,672.

(30) Foreign Application Priority Data

Mar. 31, 2017 (GB) ..................................... 1705250

(51) Int. Cl.
*B64D 11/06* (2006.01)
(52) U.S. Cl.
CPC .................................. *B64D 11/064* (2014.12)
(58) Field of Classification Search
CPC .............. B64D 11/064; B64D 11/0641; B64D 11/0643; B64D 11/0639; B64D 11/0642; B64D 11/0648
See application file for complete search history.

(56) References Cited

U.S. PATENT DOCUMENTS 2,563,629 A 8/1951 Watter
2,629,425 A 2/1953 James
(Continued)

FOREIGN PATENT DOCUMENTS

DE 4039100 6/1992
DE 10109526 3/2005
(Continued)

OTHER PUBLICATIONS

Office Action for EP Application No. 18 717 665.6-1010 dated Mar. 18, 2021.
(Continued)

*Primary Examiner* — Brady W Frazier
*Assistant Examiner* — Shanna Danielle Glover
(74) *Attorney, Agent, or Firm* — King & Partners, PLC

(57) ABSTRACT

An aircraft seat, including: a seat chassis; a seat assembly comprising a seat pan, a seat back and a leg rest; the seat pan being mounted to the seat chassis by a first pivoting connection defining a seat pan pivot axis about which the seat pan pivots, the location of the seat pan pivot axis being fixed relative to the seat chassis; the leg rest being mounted to said seat pan by a pivoting connection defining a leg rest pivot axis about which the leg rest pivots; at least one seat pan link for controlling pivoting of the seat pan about said seat pan pivot axis; and at least one leg rest link connected to the leg rest and the at least one seat pan link; wherein the at least one seat pan link is coupled to the seat pan in front of the seat pan pivot axis.

19 Claims, 29 Drawing Sheets

DETAIL A

(56) References Cited

U.S. PATENT DOCUMENTS

| | | | |
|---|---|---|---|
| 4,509,795 | A | 4/1985 | Brennen et al. |
| 4,819,987 | A | 4/1989 | Stringer |
| 5,352,020 | A | 10/1994 | Wade et al. |
| 5,447,359 | A | 9/1995 | Asbjornsen et al. |
| 5,918,942 | A | 7/1999 | Olsen |
| 6,402,244 | B1 | 6/2002 | Schönenberg et al. |
| 6,412,870 | B1 * | 7/2002 | Higgins ............... B60N 2/995 297/354.13 |
| 6,517,160 | B2 | 2/2003 | Marcantoni |
| 6,652,033 | B2 | 11/2003 | Satoh |
| 6,663,184 | B2 | 12/2003 | Hagiike |
| 6,764,137 | B2 | 7/2004 | Menard |
| 6,773,074 | B2 | 8/2004 | Flory et al. |
| 6,916,069 | B2 | 7/2005 | Bauer et al. |
| 6,929,320 | B2 | 8/2005 | Laurent |
| 7,121,627 | B2 | 10/2006 | Gaikwad et al. |
| 7,201,451 | B2 | 4/2007 | Baumann |
| 7,918,496 | B2 | 4/2011 | Mackert |
| 8,444,226 | B2 | 5/2013 | Driessen et al. |
| 8,579,375 | B2 * | 11/2013 | Marais ................ B60N 2/02 297/341 |
| 8,888,181 | B2 * | 11/2014 | Perraut ............... B60N 2/233 297/284.11 |
| 11,673,672 | B2 | 6/2023 | Simpson et al. |
| 2003/0209933 | A1 | 11/2003 | Flory et al. |
| 2004/0004383 | A1 | 1/2004 | Laurent |
| 2006/0076807 | A1 | 4/2006 | Gaikwad et al. |
| 2006/0192052 | A1 | 8/2006 | Baumann |
| 2010/0032994 | A1 | 2/2010 | Lawson |
| 2010/0244534 | A1 | 9/2010 | Driessen et al. |
| 2010/0253129 | A1 * | 10/2010 | Dowty ............ B64D 11/06395 297/85 M |
| 2011/0101751 | A1 | 5/2011 | Meister et al. |
| 2011/0240797 | A1 | 10/2011 | Behe |
| 2012/0074751 | A1 | 3/2012 | De La Garza et al. |
| 2014/0145476 | A1 | 5/2014 | Nagayasu |
| 2014/0300145 | A1 * | 10/2014 | Beroth .............. B64D 11/0643 297/83 |
| 2014/0375087 | A1 | 12/2014 | Kuno et al. |
| 2015/0008707 | A1 | 1/2015 | Erhel |
| 2016/0376007 | A1 | 12/2016 | Meindlhumer |
| 2018/0178915 | A1 * | 6/2018 | Ward ................ A47C 7/506 |

FOREIGN PATENT DOCUMENTS

| | | |
|---|---|---|
| DE | 102010032607 | 2/2011 |
| EP | 0185536 | 6/1986 |
| EP | 3078594 | 10/2016 |
| FR | 3042450 | 4/2017 |
| GB | 447327 | 5/1936 |
| GB | 2560996 | 10/2018 |
| GB | 2563314 | 12/2018 |
| GB | 2578556 | 5/2020 |
| WO | WO 2016/049351 | 3/2016 |
| WO | WO 2018/178729 | 10/2018 |

OTHER PUBLICATIONS

Office Action for GB Application No. 1705250.7 dated Sep. 25, 2020.
Office Action for GB Application No. 1705250.7 dated Feb. 27, 2020.
Office Action for GB Application No. 1705250.7 dated Jun. 6, 2018.
Office Action for GB Application No. 1705250.7 dated Sep. 22, 2017.
Office Action for GB Application No. 2000751.4 dated Feb. 25, 2020.
Office Action for GB Application No. 1805313.2 dated Aug. 5, 2019.
Office Action for GB Application No. 1805313.2 dated Oct. 8, 2018.
Office Action for U.S. Appl. No. 16/498,806 dated Feb. 15, 2022.
Office Action for U.S. Appl. No. 16/498,806 dated Jul. 21, 2022.
Partial Search Report for EP Application No. 23184557.9-1004 dated Feb. 19, 2024.

* cited by examiner

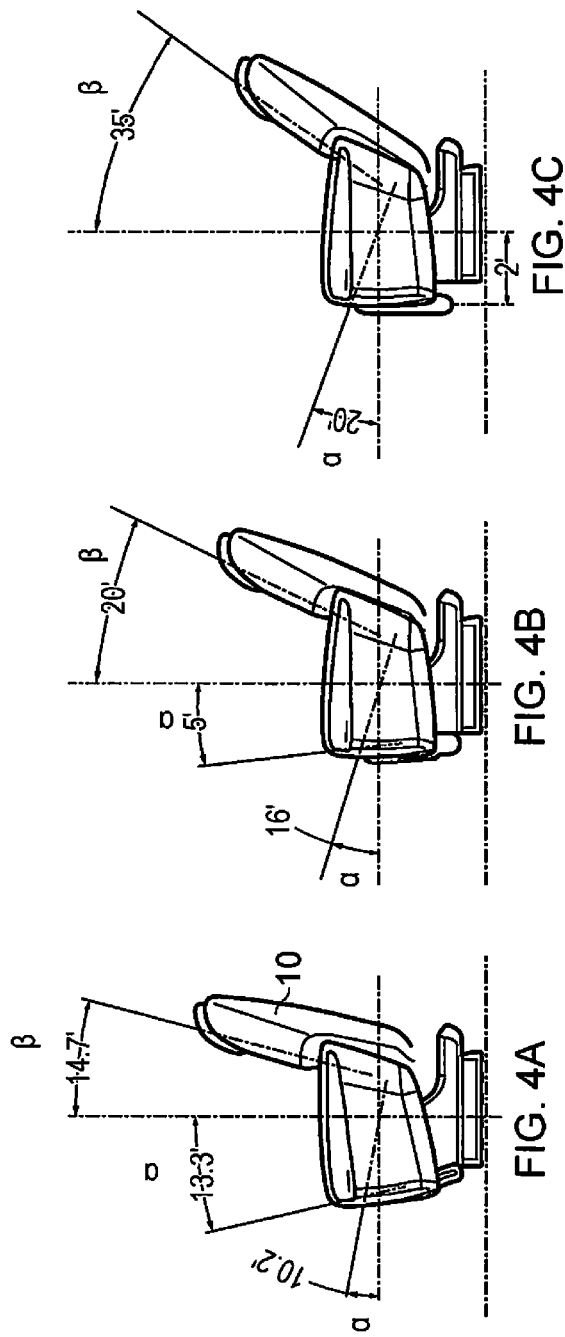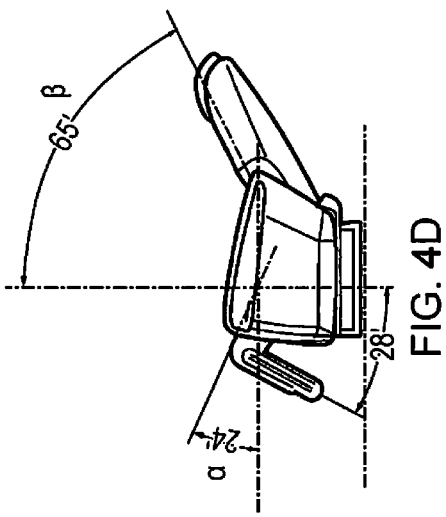

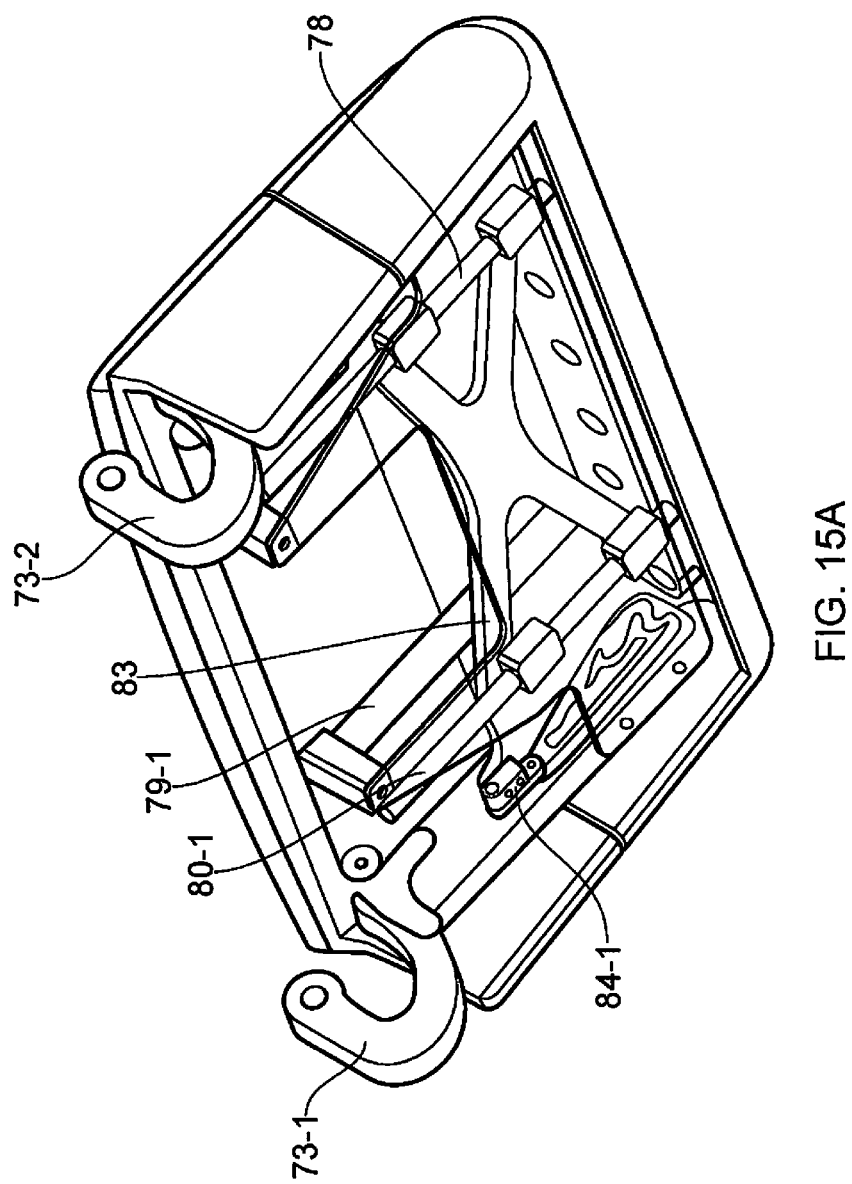

SEATING APPARATUS COMPRISING A LEG REST TRACK AND FOLLOWER

CROSS-REFERENCE TO RELATED APPLICATION(S)

This application is a continuation of U.S. application Ser. No. 16/498,806_filed Sep. 27, 2019, which is a $371 national phase of International Application Number PCT/GB2018/050900, filed on Mar. 29, 2018, which claims the benefit of Great Britain Patent Application Number 1705250.7, filed on Mar. 31, 2017-all of which are hereby incorporated herein by reference in their entirety, including all references cited therein.

TECHNICAL FIELD

The present disclosure relates to a seating apparatus. More particularly, but not exclusively, the present disclosure relates to an aircraft seat and to an aircraft.

BACKGROUND

It is known to provide an aircraft seat that is re-configurable between one or more seating configuration and a berthing configuration. A known aircraft seat typically comprises a seat back and a seat pan. A leg rest may optionally also be provided. In said berthing configuration, the seat back, the seat pan and, if fitted, the leg rest may align with each other to form a bed.

It is known from EP 2134602 to mount the seat pan to pivot about a front pivot axis. The seat pan is inclined upwardly when in a seating configuration. The rear of the seat pan is raised to re-configure the seat to a berthing configuration.

Aspects of the present invention relate to an aircraft seat; and to an aircraft as claimed in the appended claims.

SUMMARY OF THE INVENTION

According to a further aspect of the present invention there is provided aircraft seat comprising:
a seat chassis;
a seat assembly comprising a seat pan and a seat back;
the seat pan being mounted to the seat chassis by a first pivoting connection defining a seat pan pivot axis about which the seat pan pivots, the location of the seat pan pivot axis being fixed relative to the seat chassis; and
at least one seat pan link for controlling pivoting of the seat pan about said seat pan pivot axis;
wherein the at least one seat pan link is coupled to the seat pan in front of the seat pan pivot axis. The seat pan is pivoted about the seat pan pivot axis to adjust an incline angle. At least in certain embodiments the horizontal and longitudinal position of the seat pan pivot axis remains fixed in relation to the seat chassis even as the seat pan pivots. The seat pan pivot axis may be a fixed pivot axis. The first pivoting connection may thereby define a pivot axis which remains fixed relative to the seat chassis and the seat pan. This arrangement may facilitate adjustment of the incline angle of the seat pan.

At least in certain embodiments, the first pivoting connection may be configured such that the seat pan can be pivoted about said seat pan pivot axis without any related translational movement. For example, the seat pan may pivot without undergoing displacement in a longitudinal and/or vertical direction.

The seat pan pivot axis may be located in a central region of the seat pan. The seat pan pivot axis may be located in a longitudinal direction coincident with or proximal to a centre of gravity of the seat assembly. Alternatively, the seat pan pivot axis may be located in a longitudinal direction coincident with or proximal to an estimated centre of gravity of the seat assembly when occupied The seat pan pivot axis may be located at or proximal to a mid-point of the seat pan in a longitudinal direction. Alternatively, the seat pan pivot axis may be located in a rear portion of the seat pan. This seat pan pivot axis may be positioned closer to a centre of mass of a seat occupant in order to facilitate manual operation of the aircraft seat. For example, the seat occupant may more readily move their centre of mass in front of or behind the seat pivot pan axis in order to adjust the incline angle of the seat pan by weight transfer. It will be appreciated that powered or power-assisted operation of the aircraft seat is also envisaged.

At least one seat pan link may be coupled to the seat pan. The at least one seat pan link could be connected to a seat pan actuator. The at least one seat pan link may be connected to the seat pan in front of the seat pan pivot axis. The seat pan pivot axis may be located between the seat back pivot axis and a mid-point of the seat pan.

The seat pan may comprise first and second seat pan sidemembers. The seat pan sidemembers may be mounted to the seat chassis by the first pivoting connection. The seat back may be mounted to the first and second seat pan sidemembers by the second pivoting connection.

The seat chassis may comprise at least one seat pan track; and at least one seat pan follower adapted to travel in said at least one seat pan track. The at least one seat pan follower may be connected to the at least one seat pan link. Each seat pan follower may, for example, comprise a roller. The at least one seat pan track may be defined by a guide member mounted to the seat chassis.

The seat back may be mounted to said seat pan by a second pivoting connection. The second pivoting connection may define a seat back pivot axis about which the seat back pivots. The seat pan pivot axis may be located in front of the seat back pivot axis. At least one recline link may be coupled to the seat back. The at least one recline link is offset from the seat back pivot axis and is arranged to transmit a torque to the seat back. The at least one recline link could be connected to a recline actuator, such as an electromechanical actuator. The at least one recline link may be connected to the at least one seat pan link. The at least one seat pan follower may be disposed at the pivotal connection between said at least one recline link and the at least one seat pan link.

The aircraft seat may be configured to enable the seat back selectively to be decoupled from the seat pan. The at least one recline link may comprise a seat back decoupling mechanism operable selectively to decouple the at least one recline link from the seat back. The at least one recline link may, for example, comprise a lockable gas spring. The seat back decoupling mechanism may be manually operated or may be operated by an electromechanical actuator.

At least in certain embodiments, the seat back pivot axis defined by the second pivoting connection is a real pivot axis (as opposed to a virtual pivot axis). For example, the seat back pivot axis may be defined by one or more pivot pin. The second pivoting connection may be configured such that the seat back pivot axis undergoes translation relative to the seat pan as the seat back pivots about said seat pivot axis. The translation of the seat back pivot axis may comprise a vertical component and optionally also a longitudinal component. The second pivoting connection may be configured such that the seat back pivot axis is displaced downwardly (and optionally also in a rearwards direction) as the incline angle of the seat back increases. The seat back pivot axis may thereby be displaced away from the upper surface of the seat pan and the seat back as the seat back is inclined, for example as it transitions from an upright configuration to a reclined or berthing configuration. This functionality is believed to be patentable independently of the other concepts described herein.

The second pivoting connection may comprise a seat pan hinge link and a seat back hinge link. The seat pan hinge link and the seat back hinge link may be pivotally connected to each other. The seat back pivot axis may be defined by the pivoting connection of said seat pan hinge link and the seat back hinge link. Thus, the seat pan hinge link and the seat back hinge link may pivot relative to each other about said seat back pivot axis. The seat pan hinge link may comprise a first arm pivotally connected to the seat pan and a second arm movably coupled to the seat back. The second arm of the seat pan hinge link may translate relative to the seat back. The seat back hinge link may comprise a first arm pivotally connected to the seat back and a second arm movably coupled to the seat pan. The second arm of the seat back hinge link may translate relative to the seat back.

According to a further aspect of the present invention there is provided an aircraft seat comprising:
  a seat chassis;
  a seat assembly comprising a seat pan and a seat back, the seat pan being mounted to the seat chassis; and
  a seat back mounted to said seat pan by a pivoting connection comprising a seat pan hinge link and a seat back hinge link, the seat pan hinge link and the seat back hinge link being pivotally connected to each other to define a seat back pivot axis;
  wherein the seat back pivot axis is a real pivot axis and the pivoting connection is configured such that the seat back pivot axis undergoes translation relative to the seat pan as the seat back pivots about said seat pivot axis.

The pivoting connection may comprise a seat pan hinge link and a seat back hinge link. The seat pan hinge link and the seat back hinge link may be pivotally connected to each other. The seat back pivot axis may be defined by the pivoting connection of said seat pan hinge link and the seat back hinge link. Thus, the seat pan hinge link and the seat back hinge link may pivot relative to each other about said seat back pivot axis. The seat pan hinge link may comprise a first arm pivotally connected to the seat pan and a second arm movably coupled to the seat back. The second arm of the seat pan hinge link may translate relative to the seat back. The seat back hinge link may comprise a first arm pivotally connected to the seat back and a second arm movably coupled to the seat pan. The second arm of the seat back hinge link may translate relative to the seat back.

The aircraft seat may comprise a leg rest. The leg rest may be selectively deployable. The leg rest may be mounted to said seat pan by a third pivoting connection, the third pivoting connection may define a leg rest pivot axis about which the leg rest pivots. The aircraft seat may comprise at least one leg rest link coupled to the leg rest. The at least one leg rest link could be connected to a leg rest actuator, such as an electromechanical actuator.

The leg rest may be extendible. The leg rest may comprise an extending portion. The extending portion may be movable between a stowed (or retracted) position and an extended position. The at least one leg rest link may be coupled to the leg rest to control extension of the leg rest.

The aircraft seat may comprise at least one leg rest track; and at least one leg rest follower adapted to travel in said at least one leg rest track, the at least one leg rest follower being connected to said at least one leg rest link. The at least one leg rest track may be defined by a guide member mounted to the seat chassis. The at least one leg rest link may be connected to the at least one seat pan link.

The aircraft seat may be configured to enable the leg rest selectively to be decoupled from the seat pan The at least one leg rest link may comprise a leg rest decoupling mechanism operable selectively to decouple the leg rest link from the leg rest. The at least one leg rest link may, for example, comprise a lockable gas spring. The leg rest decoupling mechanism may be manually operated or may be operated by an electromechanical actuator.

According to a further aspect of the present invention there is provided an aircraft seat comprising:
  a seat chassis;
  a seat assembly comprising a seat pan and a seat back, the seat pan being mounted to the seat chassis by a first pivoting connection defining a seat pan pivot axis about which the seat pan pivots;
  a leg rest pivotally mounted to said seat pan;
  at least one leg rest link coupled to the leg rest to control pivoting of the leg rest; and
  a leg rest decoupling mechanism operable selectively to decouple the leg rest link from the leg rest.

According to a further aspect of the present invention there is provided an aircraft seat comprising:
  a seat chassis;
  a seat assembly comprising a seat pan and a seat back, the seat pan being mounted to the seat chassis; and
  a leg rest pivotally mounted to said seat pan;
  wherein the leg rest is extendible.

The leg rest may be extended to provide additional support for a seat occupant. For example, the leg rest may be extended when the aircraft seat is in a reclined configuration or a berthing configuration.

The leg rest may comprise a base portion and an extending portion. The extending portion may be movable relative to the base portion to extend the leg rest. The extending portion may be movable to at least one extended position. The at least one extended position may be predefined. The extending portion may be movable to a plurality of pre-defined extended positions. Alternatively, the extending portion may be infinitely adjustable. For example, the legrest may comprise a brake operable to lock the extending portion in an extended position. The brake may, for example, comprise a friction brake for engaging a linear track.

The leg rest may comprise a cam track and a cam follower for controlling movement of the extending portion. The cam follower may be disposed on a pivotally mounted arm.

The cam track may comprise at least one recess for retaining the extending portion in an extended position. Each recess may comprise an aperture for receiving the cam follower to retain the extending portion in the extended position.

The aircraft seat may comprise a cam follower biasing means for biasing the cam follower into the aperture. The cam follower biasing means may comprise a spring element, for example a torsion spring.

The aircraft seat may comprise extending portion biasing means for biasing the extending portion towards the base portion. The extending portion biasing means may comprise at least one tension gas spring.

The aircraft seat may comprise at least one leg rest link. The at least one leg rest link may be coupled to the leg rest to control extension of the leg rest. The at least one leg rest link may apply an actuating force to the extending portion of the leg rest.

The aircraft seat may comprise at least one armrest. The at least one armrest may be movable relative to said seat chassis. This may enable the width of the aircraft seat to be increased and in certain arrangements this may improve occupant comfort levels, for example when the aircraft seat is in a berthing configuration.

According to a further aspect of the present invention there is provided an aircraft seat comprising:
a seat chassis;
a seat assembly comprising a seat pan and a seat back, the seat pan being mounted to the seat chassis by a first pivoting connection defining a seat pan pivot axis about which the seat pan pivots; and
comprising at least one armrest, the at least one armrest being movable relative to said seat chassis. The at least one armrest may, for example, be movable relative to said seat chassis in a vertical plane.

The at least one armrest may be pivotally connected to the seat back. At least one armrest link may pivotally couple the at least one armrest and the seat chassis.

The at least one armrest may be movable vertically relative to the seat chassis. For example, the at least one armrest may move vertically as the aircraft seat is re-configured. The height of the at least one armrest may be reduced as the aircraft seat is reclined. The at least one armrest may be disposed in a lowermost position when the aircraft seat is in a berthing configuration. The at least one armrest may be disposed in an uppermost position when the aircraft seat is in a take-off, taxi and landing (TTL) configuration The aircraft seat may comprise a seat base for mounting fixedly to a floor of an aircraft. The seat chassis may be movably mounted to said seat base. The seat base may comprise at least one longitudinal guide to provide longitudinal movement of the seat chassis relative to the seat base. The seat base may comprise at least one transverse guide to provide transverse movement of the seat chassis relative to the seat base. The seat base may provide vertical movement.

The seat base may comprise a turntable to enable the angular orientation of the seat chassis relative to be adjusted relative to the seat base.

The seat pan may comprise first and second seat pan sidemembers. The first and second seat pan sidemembers may be mounted to said seat chassis. A first tension membrane may be supported by said first and second seat pan sidemembers.

The seat chassis may comprise first and second base sidemembers. The first pivoting connection may mount said first and second seat pan sidemembers to said first and second base sidemembers. For example, one or more pivot pin and bearing(s) may be provided to mount said first and second seat pan sidemembers to said first and second base sidemembers.

The seat base may be rotatable about a vertical axis. Alternatively, or in addition, the seat base may translate in a horizontal and/or vertical direction. At least in certain embodiments, the seat base may be configured such that rotation about a transverse axis is inhibited. The seat base sidemembers may not pivot about a transverse axis. The orientation of the seat base sidemembers may thereby be fixed.

The seat back may comprise first and second seat back sidemembers. A second tension membrane may be supported by said first and second seat back sidemembers.

The aircraft seat may be selectively configurable in a berthing configuration and one or more seating configuration. The seat pan, the leg rest and the seat back may be at least substantially aligned with each other when the aircraft seat is in said berthing configuration.

According to a further aspect of the present invention there is provided aircraft seat comprising:
a seat chassis;
a seat assembly comprising a seat pan and a seat back;
the seat pan being mounted to the seat chassis by a first pivoting connection defining a seat pan pivot axis about which the seat pan pivots.

The seat back may be mounted to the seat pan. The seat back may be pivotally mounted to the seat pan.

The aircraft seat may be configurable in at least first and second seating configurations. The first seating configuration may comprise a take-off, taxi and landing (TTL) configuration. The second seating configuration may comprise a reclined configuration. The seat back may be inclined at a fixed angle relative to the seat pan in said first and second seating configurations. By way of example, the fixed angle may be approximately 10°, 15°, 20° or 25°. The orientation of the seat back relative to the seat pan may remain at least substantially fixed as the aircraft seat transitions between said first and second seating configurations.

The aircraft seat may be configurable in a berthing configuration. The seat back may pivot relative to the seat pan to configure the aircraft seat in the berthing configuration. The aircraft seat may transition from the first or second seating configuration to the berthing configuration. The seat back may be at least substantially aligned with each other in the berthing configuration. The seat back may be inclined relative to the seat pan at an angle of at least 160° or 170° in the berthing configuration. At least in certain embodiments, the seat back may be inclined relative to the seat pan at an angle of approximately 180° in the berthing configuration.

The location of the seat pan pivot axis may be fixed relative to the seat chassis. At least one seat pan link may be provided for controlling pivoting of the seat pan about said seat pan pivot axis. The seat pan pivot axis may be located at or proximal to a mid-point of the seat pan in a longitudinal direction. Alternatively, the seat pan pivot axis may be located in a rear portion of the seat pan. The seat pan pivot axis may be positioned at or proximal to a centre of mass of a seat occupant in order to facilitate manual operation of the aircraft seat. For example, the seat occupant may more readily move their centre of mass in front of or behind the seat pivot pan axis in order to adjust the incline angle of the seat pan by weight transfer. It will be appreciated that powered or power-assisted operation of the aircraft seat is also envisaged. By positioning the seat pan pivot axis at or proximal to a centre of mass of the seat occupant, the actuating force required to pivot the seat pan may be reduced.

The at least one seat pan link may be coupled to the seat pan in front of the seat pan pivot axis. The seat pan may pivot about the seat pan pivot axis to adjust an incline angle. At least in certain embodiments the horizontal and longitudinal position of the seat pan pivot axis remains fixed in relation to the seat chassis. The seat pan pivot axis may be a fixed pivot axis. The first pivoting connection may thereby define a pivot axis which remains fixed relative to the seat chassis and the seat pan.

According to a further aspect of the present invention there is provided an aircraft comprising first and second aircraft seat as described herein. The first and second aircraft seat may be arranged to face each other. When the first aircraft seat is in said berthing configuration and the second aircraft seat is in said seat configuration, the seat pan, the leg rest and the seat back of said first aircraft seat align with the seat pan of the second aircraft seat. The first and second aircraft seat may be spaced apart from each other such that, when said first aircraft seat is in said berthing configuration and the second aircraft seat is in said seat configuration, the leg rest of the first aircraft seat and the seat pan of the second aircraft seat form a substantially continuous surface.

According to a further aspect of the present invention there is provided an aircraft comprising one or more aircraft seat as described herein.

The present invention has been described with particular reference to an aircraft seat for use in an aircraft. According to further aspects of the present invention, the seat described herein may be used in other types of vehicle. By way of example, the seat described herein may be configured for use in one or more of the following: an automobile, a train, a boat, a ship, a luxury yacht (a sailing yacht or a motor yacht), etc. In certain embodiments, the seat described herein may be in the form of a vehicle seat suitable for a vehicle. Other applications for the seat described herein are also envisaged.

The references herein to a real pivot axis refer to a physical pivot axis or an actual pivot axis. The real pivot axis may, for example, be defined by one or more pivot pin. In arrangements comprising more than one pivot pin, the pivot pins may be arranged coaxially to define said real pivot axis. For example, the real pivot axis may be defined by opposing first and second pivot pins.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the present invention will now be described, by way of example only, with reference to the accompanying figures, in which:

FIG. 4A shows a side elevation of the aircraft seat in a dining configuration;

FIG. 4B shows a side elevation of the aircraft seat in a take-off, taxi and landing (TTL) configuration;

FIG. 4C shows a side elevation of the aircraft seat in a partially reclined configuration;

FIG. 4D shows a side elevation of the aircraft in a reclined configuration;

FIG. 4E shows a side elevation of the aircraft in a berthing configuration;

FIG. 15A shows a perspective view of an underside of the extendible leg rest shown in FIGS. 13A and 13B;

DETAILED DESCRIPTION

Figure 1:
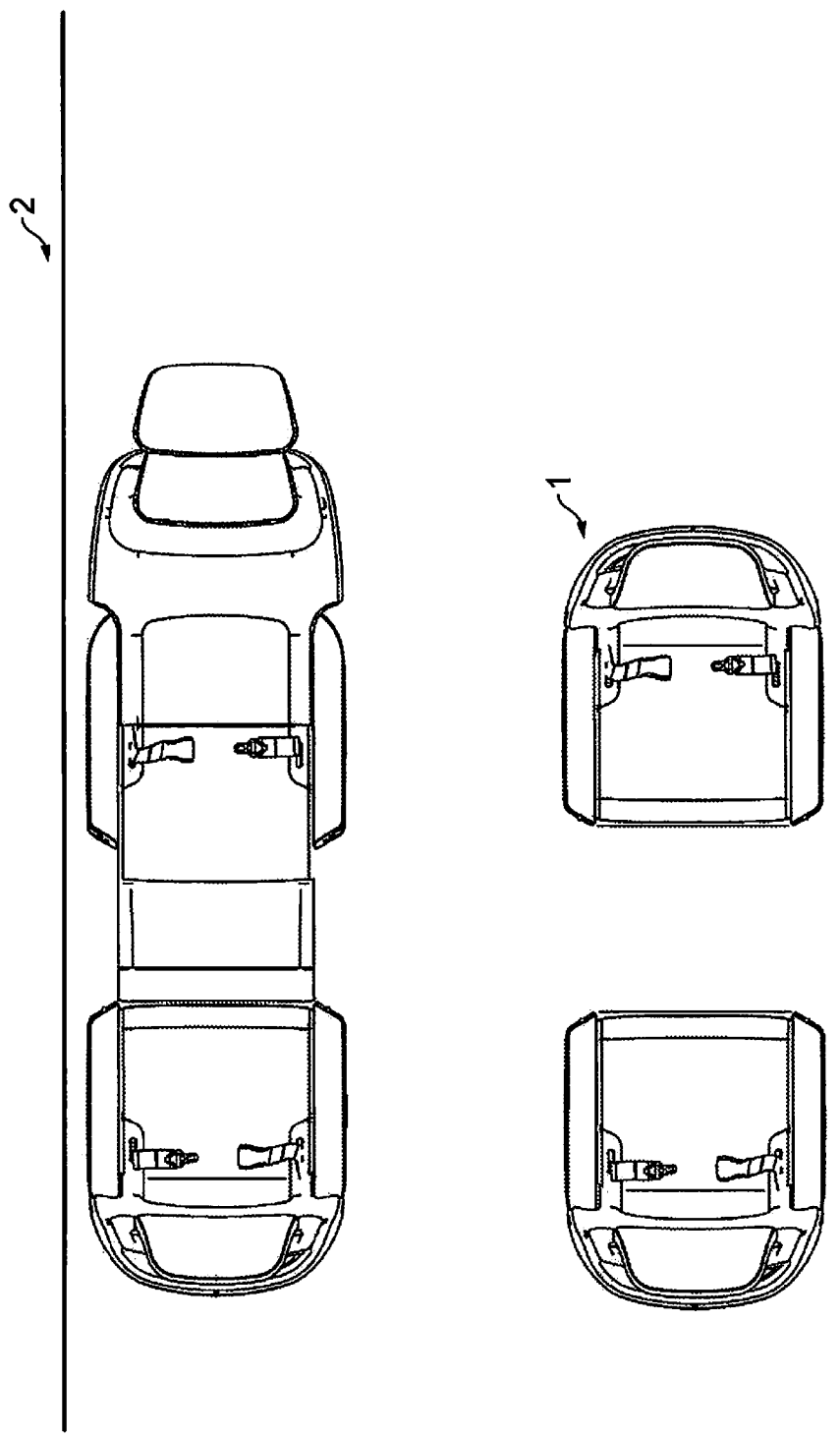
FIG. 1 shows a schematic representation of an aircraft comprising aircraft seat in accordance with an embodiment of the present invention.

An aircraft seat 1 in accordance with an embodiment of the present invention will now be described with reference to the accompanying figures. The aircraft seat 1 in the present embodiment is re-configurable between a plurality of seating configurations and a berthing configuration. The aircraft seat 1 in the present embodiment is an executive seat of the type typically installed in an executive aircraft 2 (shown schematically in FIG. 1). However, it will be appreciated that the invention(s) described herein may be implemented in other types of aircraft seat.

Figure 2:
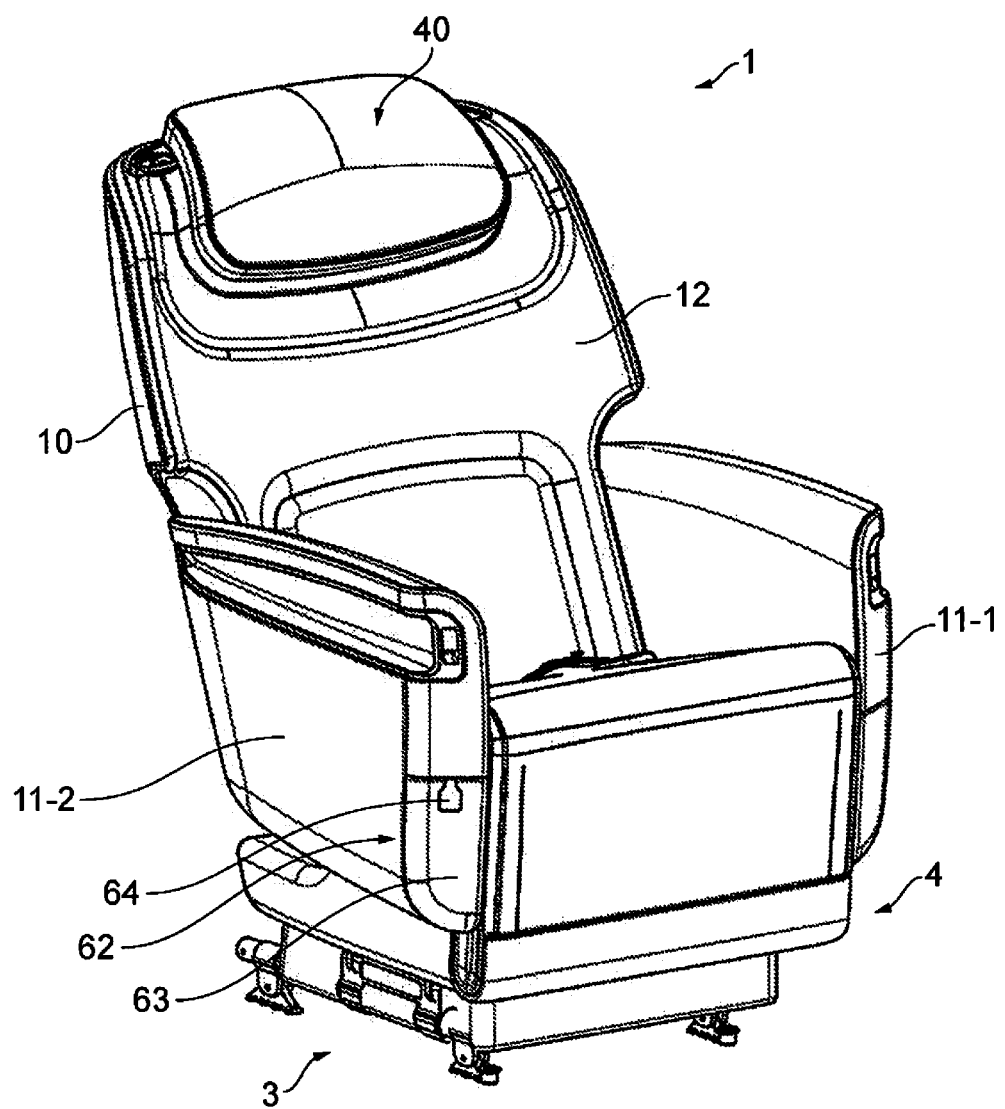
FIG. 2 shows a perspective view of the aircraft seat shown in FIG. 1.
Figure 3:
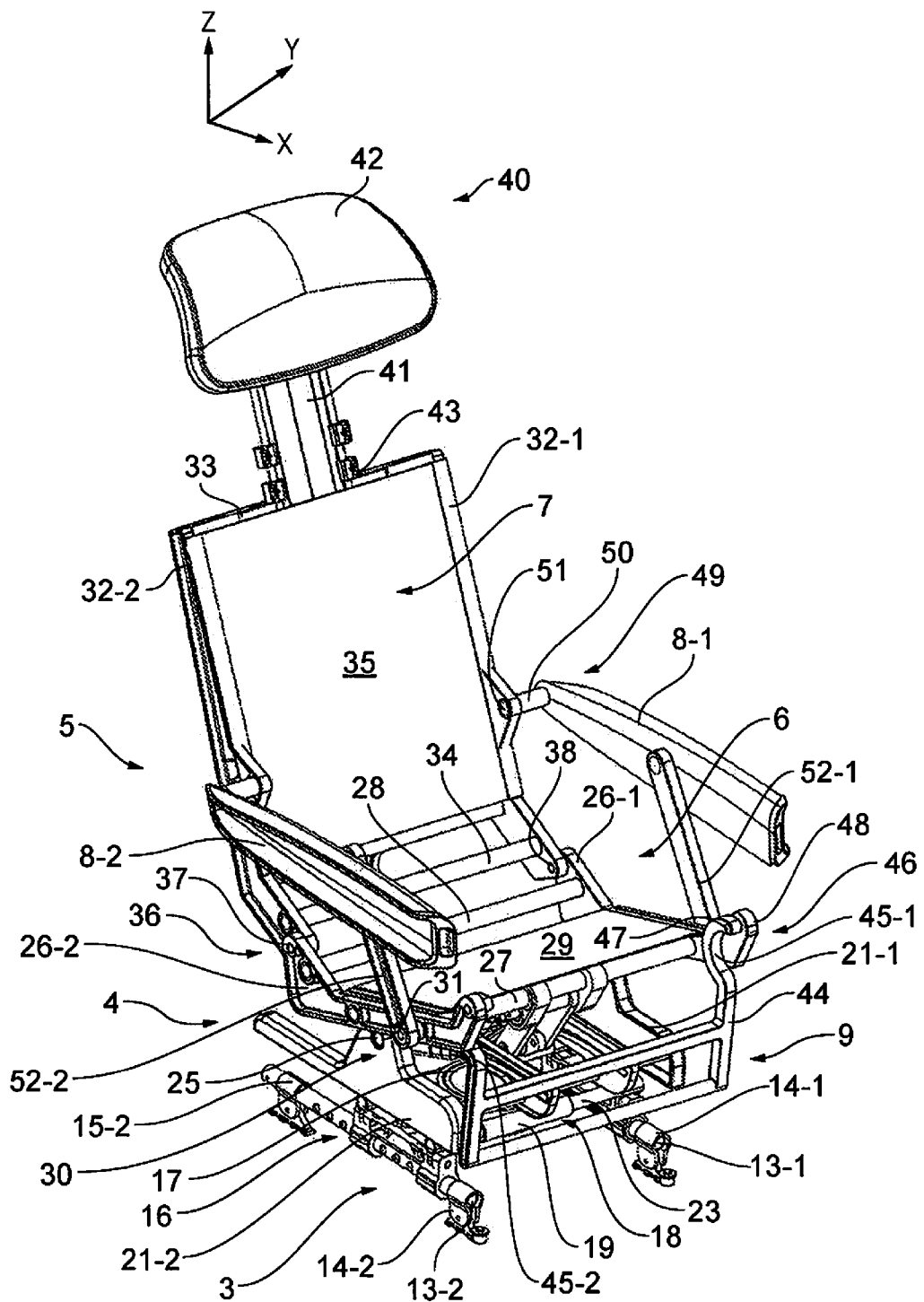
FIG. 3 shows a perspective view of the aircraft seat shown in FIG. 2 with the trim panels and seating trim cover omitted.
Figure 5:
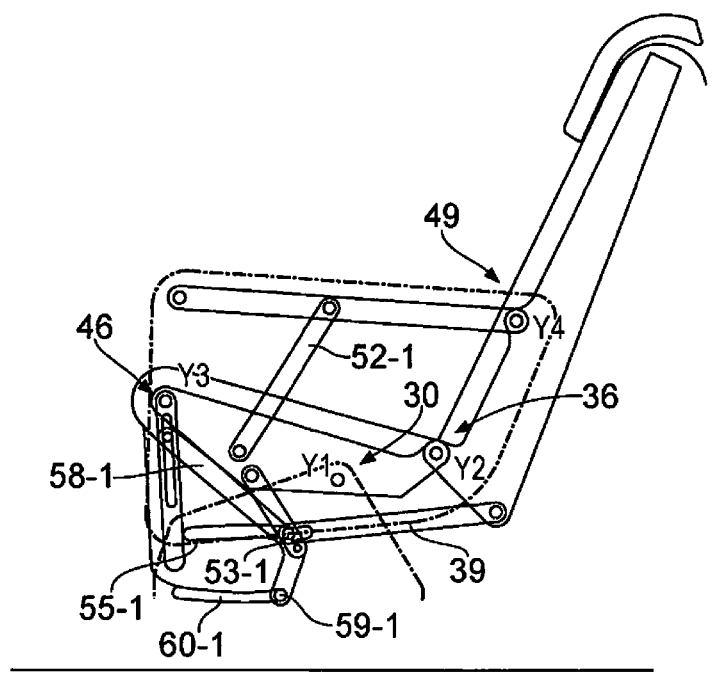
FIG. 5 shows a schematic representation of the aircraft seat in the TTL configuration.
Figure 6:
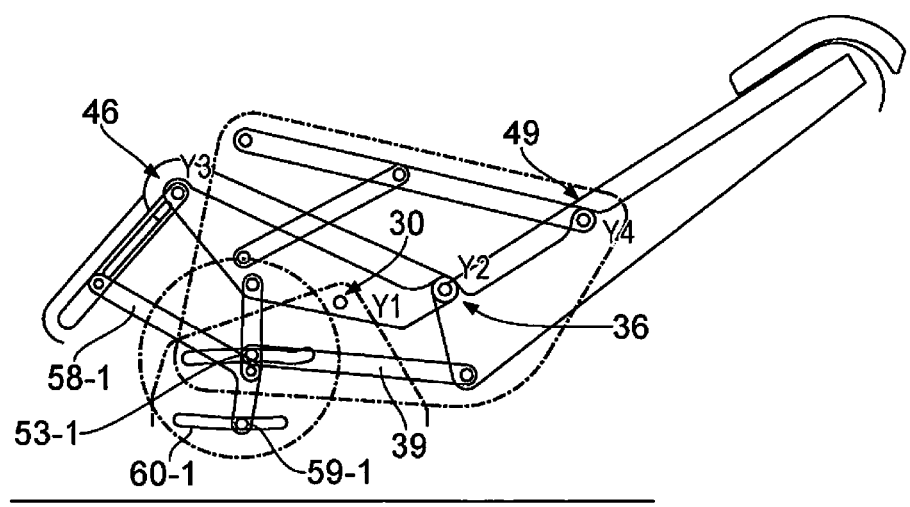
FIG. 6 shows a schematic representation of the aircraft seat in the partially reclined configuration.
Figure 7:
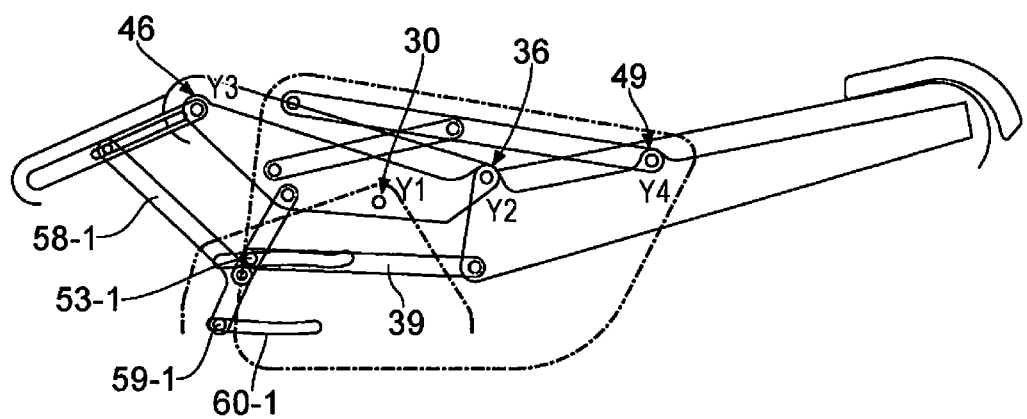
FIG. 7 shows a schematic representation of the aircraft seat in the reclined configuration.

With reference to FIGS. 2 and 3, the aircraft seat 1 comprises a seat base 3, a seat chassis 4 and a seat assembly 5. The aircraft seat 1 is described herein in relation to a seat reference frame comprising a longitudinal axis X, a transverse axis Y and a vertical axis Z. The seat base 3 is adapted to be fixedly mounted to a floor of the aircraft 2. The seat base 3 may, for example, be fastened to mounting rails provided in a floor of the aircraft 2. It will be understood that the seat base 3 may be mounted in a forward-facing or a rear-facing arrangement in the aircraft 2. The seat chassis 4 is mounted to the seat base 3. As described herein, the seat base 3 is configured to enable the position of the seat chassis 4 to be adjusted along said longitudinal axis X and optionally also along said transverse axis Y. The seat base 3 in the present embodiment also allows the seat chassis 4 to be rotated through 180° about said vertical axis Z to adjust the orientation of the seat assembly 5 in the aircraft 2. Unless indicated to the contrary, the terms front and rear are used herein to define the relative position of features in the seat chassis 4 and the seat assembly 5.

The seat assembly 5 comprises a seat pan 6; a seat back 7; first and second armrests 8-1, 8-2; and a leg rest 9. As shown in FIG. 2, the aircraft seat 1 comprises a seat back trim panel 10; first and second armrest trim panels 11-1, 11-2; and a seating trim cover 12. The seat back trim panel 10; the first and second armrest trim panels 11-1, 11-2; and the seating trim cover 12 may be attached to the seat assembly 5 using suitable mechanical fasteners. The seating trim cover 12 comprises padding or cushioning. The seating trim cover 12 may, for example, form a seat squab supported by the seat pan 6; and a backrest cushion supported by the seat back 7. In a modified arrangement, a separate seat squab and backrest cushion may be provided.

The aircraft seat 1 is shown in FIG. 3 with the seat back trim panel 10; the first and second armrest trim panels 11-1, 11-2; and the seating trim cover 12 omitted. The seat base 3 comprises first and second longitudinal guide tubes 13-1, 13-2 having front and rear fixing brackets 14-1, 14-2, 15-1, 15-2 for mounting the aircraft seat 1 to the floor of the aircraft 2. The seat base 3 comprises a longitudinal carrier 16, a turntable 17 and a transverse carrier 18. The longitudinal carrier 16 is mounted to said first and second longitudinal guide tubes 13-1, 13-2. The longitudinal carrier 16 is movable along said first and second longitudinal guide tubes 13-1, 13-2 to enable the position of the seat chassis 4 to be adjusted along said longitudinal axis X. A longitudinal travel locking mechanism (not shown) is provided to control the longitudinal movement of the longitudinal carrier 16 along said first and second longitudinal guide tubes 13-1, 13-2. The turntable 17 is mounted to the longitudinal carrier 16 and the transverse carrier 18 is mounted to said turntable 17. The turntable 17 is arranged to enable the transverse carrier 18 to be rotated about said vertical axis Z. In the present embodiment, the turntable 17 provides rotation of up to 180° about said vertical axis Z. A turntable locking mechanism (not shown) is provided to control the rotation of the turntable 17 about said vertical axis Z. The transverse carrier 18 comprises front and rear transverse sleeves 19 for movably mounting the seat chassis 4. The seat base 3 may optionally comprise one or more actuator (not shown), such as an electromechanical actuator, to adjust the longitudinal, transverse and angular position of the seat chassis 4. In a variant, the seat base 3 may be modified to omit one or more of the mechanisms provided for adjusting the longitudinal, transverse and angular position of the seat chassis 4.

The seat chassis 4 comprises first and second base sidemembers 21-1, 21-2; and front and rear mounting tubes 23. The first and second base sidemembers 21-1, 21-2 are disposed on respective sides of the seat chassis 4 and are adapted to mount the seat base 3. The front and rear mounting tubes 23 extend transversely between said first and second base sidemembers 21-1, 21-2. As shown in FIG. 3, the front and rear mounting tubes 23, 24 are disposed in the front and rear transverse sleeves 19 and movably mount the seat chassis 4 to the seat base 3. The front and rear mounting tubes 23 are movable within said front and rear transverse sleeves 19 to enable the position of the seat chassis 4 to be adjusted along said transverse axis Y. A transverse travel locking mechanism (not shown) is provided to control the transverse movement of the seat chassis 4. First and second aircraft seat pan pivot pins 25 are mounted in said first and second base sidemembers 21-1, 21-2 respectively. As described herein, the first and second aircraft seat pan pivot pins 25 are arranged to pivotally mount the seat assembly 5 to the seat chassis 4.

The seat assembly 5 will now be described with reference to FIG. 3. As outlined above, the seat assembly 5 comprises a seat pan 6; a seat back 7; first and second armrests 8-1, 8-2; and a deployable leg rest 9. The seat pan 6 comprises first and second seat pan sidemembers 26-1, 26-2, and front and rear transverse tubes 27, 28. A first tension membrane 29 is supported by said first and second seat pan sidemembers 26-1, 26-2. The first tension membrane 29 may, for example, comprise a woven fabric. The seat pan 6 is mounted to the seat chassis 4 by a first pivoting connection (denoted generally by the reference numeral 30) having a seat pan pivot axis Y1. The seat pan pivot axis Y1 is a real pivot axis (as opposed to a virtual pivot axis) having a fixed position relative to the seat chassis 4 and the seat assembly 5. The seat pan 6 pivots about said seat pan pivot axis Y1 to adjust an incline angle of the seat pan 6. The seat pan pivot axis Y1 is located in a central region of the seat assembly 5 to facilitate pivoting of the seat pan 6. The seat pan pivot axis Y1 can be positioned at or proximal to a centre of gravity of the seat assembly 5 (in a longitudinal direction) to facilitate pivoting of the seat pan 6. In certain embodiments, the seat pan 6 may be pivoted using weight transfer. A seat occupant may shift their weight in the seat assembly 5, for example by leaning forwards and backwards, to shift their centre of gravity in front of or behind the seat pan pivot axis Y1. The first pivoting connection 30 comprises the aforementioned first and second aircraft seat pan pivot pins 25 which are mounted in first and second aircraft seat pan bearings 31. The first and second aircraft seat pan bearings 31 are mounted in said first and second base sidemembers 21-1, 21-2. The first and second aircraft seat pan pivot pins 25 define the seat pan pivot axis Y1. A seat incline locking mechanism (not shown) is provided to lock the angular orientation of the seat pan 6. The seat incline locking mechanism may be adapted to enable the seat pan 6 to be locked at any incline angle within an operating range (i.e. infinitely variable). Alternatively, the seat incline locking mechanism may be operable to lock the seat pan 6 in one of a plurality of predefined angular orientations. The seat incline locking mechanism may be operated manually or by an actuator, such as an electromechanical actuator.

The seat back 7 comprises first and second seat back sidemembers 32-1, 32-2, and upper and lower transverse tubes 33, 34. The first and second seat back sidemembers 32-1, 32-2 are disposed on respective sides of the seat back 7 and support a second tension membrane 35. The second tension membrane 35 may, for example, comprise a woven fabric. The seat back 7 is mounted to the seat pan 6 by a second pivoting connection (denoted generally by the reference numeral 36) having a seat back pivot axis Y2. The seat back pivot axis Y2 is located behind said seat pan pivot axis Y1. The seat back 7 pivots about said seat back pivot axis Y2 to adjust a recline angle. The second pivoting connection 36 comprises first and second aircraft seat back pivot pins 37 mounted in first and second aircraft seat back bearings 38. The first and second aircraft seat back pivot pins 37 are mounted in the first and second seat pan sidemember 26-1, 26-2 respectively; and the first and second aircraft seat back bearings 38 are mounted in the first and second seat back sidemembers 32-1, 32-2 respectively. The first and second aircraft seat back pivot pins 37 define the seat back pivot axis Y2 about which the seat back 7 pivots relative to the seat pan 6. The seat back 7 comprises recline control arms 39 adapted to control a recline angle of the seat back 7. In the present embodiment, the recline control arms 39 are extensions of the seat back sidemembers 32-1, 32-2 and project downwardly below the seat pan 6. A headrest 40 comprising a mounting member 41 and a head support 42 is mounted to the seat back 7. The mounting member 41 is located in a vertical channel 43 mounted between the first and second seat back sidemembers 32-1, 32-2. The mounting member 41 is movable within the said vertical channel 43 to adjust the position of the head support 42. A headrest locking mechanism (not shown) may be provided to control the vertical position of the headrest 40. The headrest locking mechanism may be operated manually or by an actuator, such as an electromechanical actuator.

The leg rest 9 comprises a ladder frame 44 having first and second mounting arms 45-1, 45-2. The leg rest 9 is mounted to the seat pan 6 by a third pivoting connection (denoted generally by the reference numeral 46) having a leg rest pivot axis Y3. The leg rest 9 pivots about said leg rest pivot axis Y3 to adjust a deployment angle. The third pivoting connection 46 comprises first and second leg rest pivot pins 47 mounted in first and second leg rest bearings 48. The first and second leg rest pivot pins 47 are mounted in the first and second mounting arms 45-1, 45-2; and the first and second leg rest bearings 48 are mounted in the first and second seat pan sidemember 26-1, 26-2 of the seat assembly 5. The first and second leg rest pivot pins 47 define the leg rest pivot axis Y3 about which the leg rest 9 pivots relative to the seat pan 6.

The first and second armrests 8-1, 8-2 are mounted on respective sides of the seat assembly 5. In particular, the first and second armrests 8-1, 8-2 are pivotally mounted to the first and second seat back sidemembers 32-1, 32-2 of the seat back 7. The first and second armrests 8-1, 8-2 are mounted to the first and second seat back sidemembers 32-1, 32-2 by a fourth pivoting connection (denoted generally by the reference numeral 49) having an armrest pivot axis Y4. The fourth pivoting connection 49 comprises first and second armrest pivot pins 50 mounted in first and second armrest bearings 51 mounted in the first and second armrests 8-1, 8-2 respectively. First and second armrest links 52-1, 52-2 connect the first and second armrests 8-1, 8-2 to the first and second seat pan sidemembers 26-1, 26-2. The first and second armrest links 52-1, 52-2 are pivotally connected at both ends to accommodate movement of the first and second armrests 8-1, 8-2 relative to the seat chassis 4. The first and second armrest links 52-1, 52-2 control the angular orientation of the first and second armrests 8-1, 8-2. It will be understood that the first and second armrest 8-1, 8-2 also translate (in longitudinal and vertical directions) as the recline angle of the seat back 7 changes.

The aircraft seat 1 is re-configurable between multiple seating configurations and a berthing configuration. The different configurations of the aircraft seat 1 according to the present embodiment are illustrated in FIGS. 4A-E. The aircraft seat 1 is shown in a dining configuration in FIG. 4A; a take-off, taxi and landing (TTL) configuration in FIG. 4B, a partially reclined configuration in FIG. 4C, a reclined configuration in FIG. 4D; and the berthing configuration in FIG. 4E. When in the reclined configuration shown in FIG. 4D, the seat assembly 5 may be at least partially balanced and this may be referred to as a "Zero G" position. The combined centre of gravity of the seat assembly 5 and the seat occupant may be aligned with or proximate to the seat pan pivot axis Y1. In this reclined configuration, there is substantially even weight distribution such that the loading applied to the occupant is substantially uniform. The incline angle of the seat pan 6 (relative to the longitudinal axis X); the recline angle of the seat back 7 (relative to the vertical axis Z); and the deployment angle of the leg rest 9 (relative to the vertical axis Z) are shown in each of FIGS. 4A-E. The aircraft seat 1 is re-configured by pivoting the seat pan 6 about the seat pan pivot axis Y1 defined by the first pivoting connection 30. The pivoting movement of the seat assembly 5 controls the recline angle of the seat back 7, the angular orientation of the first and second armrests 8-1, 8-2 and the deployment angle of the leg rest 9.

The features of the aircraft seat 1 which control the relative movement of the seat pan 6, the seat back 7 and the leg rest 9 now be described with reference to FIGS. 5 to 9. These FIGS. show a schematic side elevation of the aircraft seat 1 with the seat trim panels 10, 11-1, 11-2 and the seating trim cover 12 omitted for clarity. The control links within the aircraft seat 1 are duplicated on the first and second sides, but only those control links on the first side are visible in FIGS. 5 to 9. The aircraft seat 1 is shown in a take-off, taxi and landing (TTL) configuration in FIG. 5, a partially reclined configuration in FIG. 6, a reclined configuration in FIG. 7; and the berthing configuration in FIG. 8. The seat assembly 5 comprises first and second aircraft seat pan links 53-1 connected at a first end to the seat pan 6. First and second seat pan track followers 54-1 are mounted partway along the length of the first and second aircraft seat pan links 53-1. The first and second seat pan track followers 54-1 are rollers in the present embodiment and are adapted to travel in respective first and second seat pan tracks 55-1. The first and second seat pan tracks 55-1 are defined in first and second aircraft seat pan guide members 56-1, 56-2 (shown in FIG. 2) fixedly mounted on respective sides of the seat chassis 4. As shown in more detail in FIG. 9, the first and second seat pan tracks 55-1 comprise a generally arcuate path having a virtual centre disposed below said first and second aircraft seat pan guide members 56-1, 56-2. Thus, a central portion of the first and second seat pan tracks 55-1 is disposed above the ends thereof. The first and second seat pan tracks 55-1 also comprise an up-turned section at the rear end thereof. The first and second seat pan track followers 54-1 travel in said first and second seat pan tracks 55-1 as the seat pan 6 pivots about the seat pan pivot axis Y1. First and second recline links 57-1 are connected on respective sides of the recline control arm 39 of the seat back 7. The first and second recline links 57-1 are pivotally connected to the first and second aircraft seat pan links 53-1. The first and second aircraft seat pan links 53-1 pivot about the first and second seat pan track followers 54-1 as the incline angle of the seat pan 6 changes.

Figure 9:
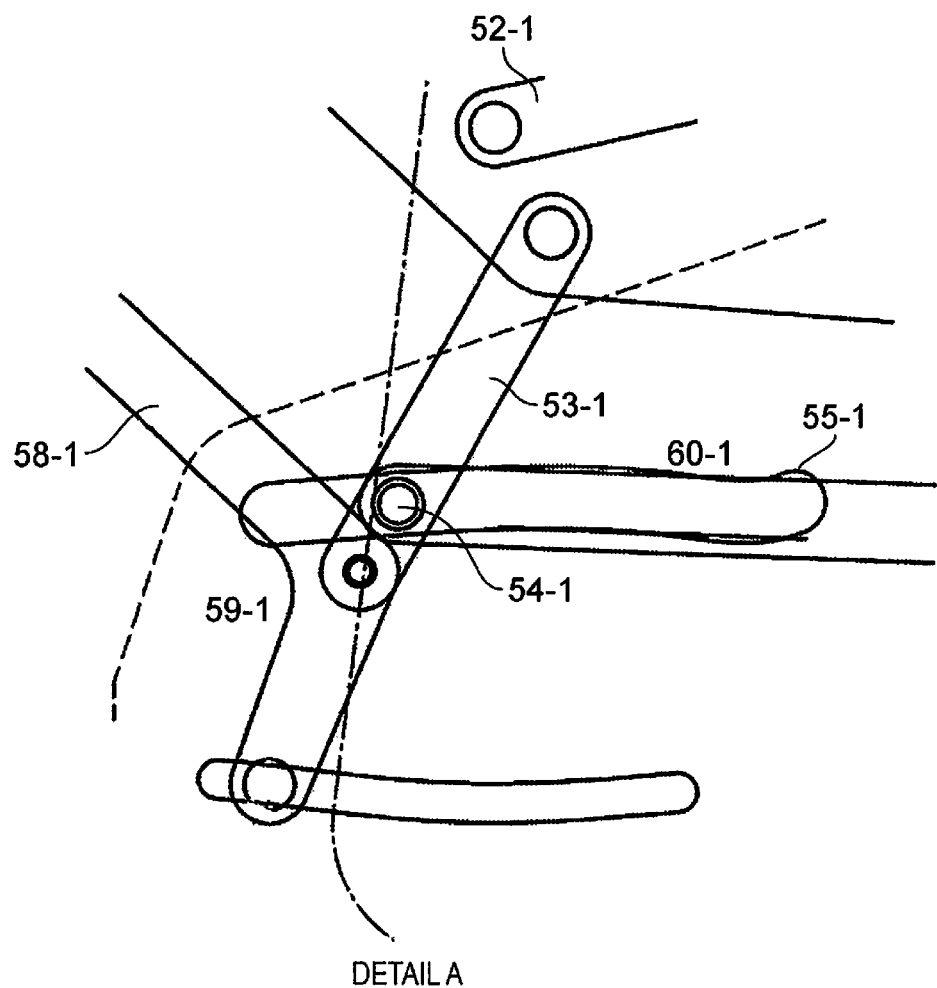
FIG. 9 shows an enlarged view of the seat pan track and the leg rest track of the seat chassis when the aircraft seat is in the reclined configuration shown in FIG. 7.

The seat assembly 5 comprises first and second leg rest links 58-1. The first and second leg rest links 58-1, 58 are dog-leg links. A first end of said first and second leg rest links 58-1 is connected to the leg rest 9. First and second leg rest track followers 59-1A are mounted to a second end of said first and second leg rest links 58-1. The first and second leg rest track followers 59-1 are adapted to travel in respective first and second leg rest tracks 60-1. The first and second leg rest links 58-1 are pivotally connected to a second end of the first and second aircraft seat pan links 53-1. The first and second aircraft seat pan links 53-1 pivot about the first and second seat pan track followers 54-1 and function as levers to impart an actuating force to the first and second leg rest links 58-1. The first and second leg rest track followers 59-1 are rollers in the present embodiment. The first and second leg rest tracks 60-1 are defined in first and second leg rest guide members fixedly mounted on respective sides of the seat chassis 4. The first and second leg rest track followers 59-1 travel in said first and second leg rest tracks 60-1 as the seat pan 6 pivots about the seat pan pivot axis Y1. As shown in FIG. 9, the first and second leg rest tracks 60-1 comprise a generally arcuate path having a virtual centre disposed above said first and second aircraft seat leg rest guide members. Thus, a central portion of the first and second leg rest tracks 60-1 is disposed below the ends thereof.

The first and second aircraft seat pan links 53-1; the first and second recline links 57-1; and the first and second leg rest links 58-1 connect the seat pan 6, the seat back 7 and the leg rest 9. Thus, the seat pan 6, the seat back 7 and the leg rest 9 move in concert with each other. In particular, adjusting the incline angle of the seat pan 6 changes the recline angle of the seat back 7 and the deployment angle of the leg rest 9. In the present embodiment the aircraft seat 1 is manually adjustable. A seat occupant can pivot the seat pan 6 about said seat pan pivot axis Y1 by changing their weight distribution in the seat assembly 5, for example by leaning backwards or forwards. The seat pan pivot axis Y1 is disposed in a rear portion of the seat pan 6 to facilitate adjusting the incline angle of the seat pan 6. At least when the aircraft seat 1 is in a seating configuration, the seat occupant may shift their centre of mass in front of or behind the seat pan pivot axis Y1 to adjust the incline angle of the seat pan 6. The change in the incline angle of the seat pan 6 results in a change in the recline angle of seat back 7 and the deployment angle of the leg rest 9. The aircraft seat 1 could be power assisted, for example incorporating one or more electromechanical actuator.

Figure 8:
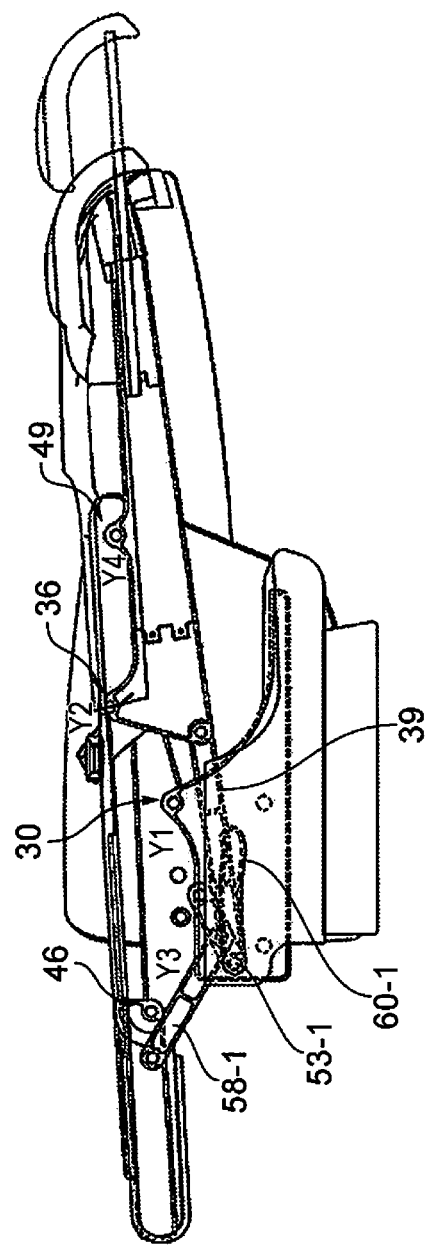
FIG. 8 shows a schematic representation of the aircraft seat in the berthing configuration.
Figure 10:
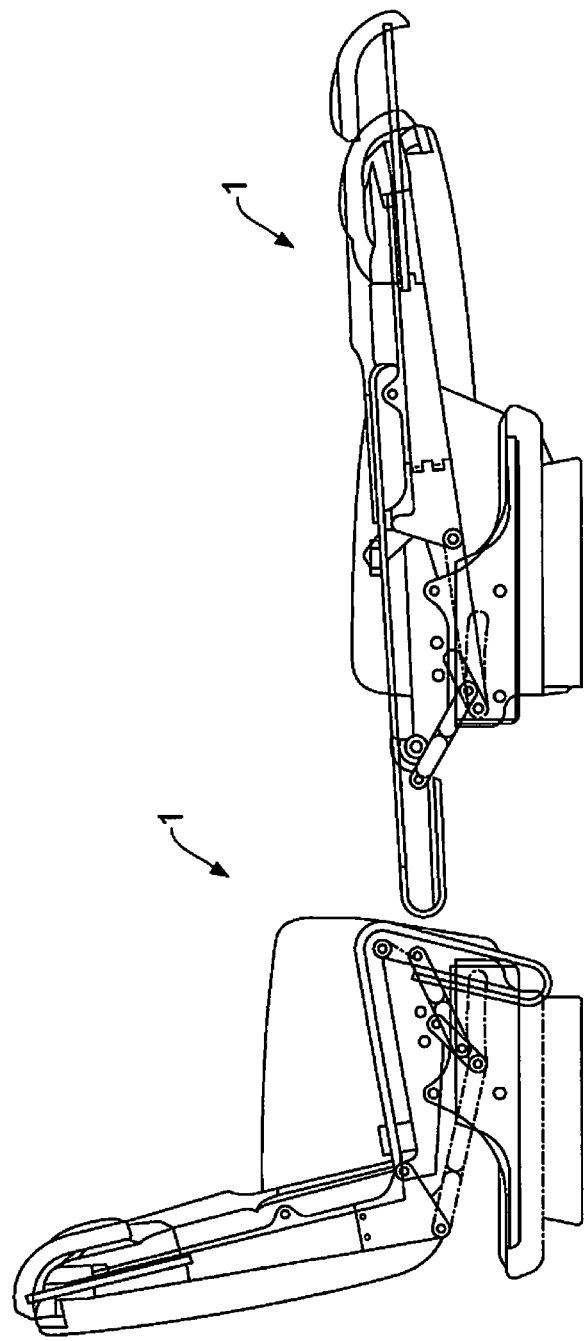
FIG. 10 shows a side elevation of first and second like aircraft seat arranged to form an extending berthing configuration in accordance with a further aspect of the present invention.

The aircraft seat 1 in the present embodiment can be configured in a berthing configuration, as shown in FIGS. 4E and 8. When in said berthing configuration, the seat pan 6, the seat back 7 and the leg rest 9 are at least substantially aligned with each other to form a substantially continuous surface. It may be desirable in certain scenarios to extend the resulting surface. The aircraft seat 1 may be configured in the aircraft 2 such that two of said aircraft seats 1 may be arranged to form an extended surface in said berthing configuration. With reference to FIG. 10, a first said aircraft seat 1 may be arranged in said berthing configuration while a second said aircraft seat 1 remains in a seating configuration, for example the dining configuration. With the first and second aircraft seat 1 in this arrangement, the leg rest 9 of the first said aircraft seat 1 may be at least substantially aligned with the seat pan 6 of the second said aircraft seat 1. The first and second aircraft seat 1 may be mounted in the aircraft 2 in a face-to-face arrangement, or one of said aircraft seat 1 may be rotated through 180° about said vertical axis Z to provide the required arrangement. As illustrated in FIG. 10, the headrest 40 of the first said aircraft seat 1 may be extended further to extend the surface.

As described herein, the aircraft seat 1 may be manually re-configured between said seating configurations and/or said berthing configuration. A further feature of the aircraft seat 1 is the arrangement whereby first and second channels 61-1, 61-2 are incorporated into the lateral outer surfaces of the first and second armrest trim panels 11-1, 11-2. The first and second channels 61-1, 61-2 in the present embodiment each extends along substantially the full length of the first and second armrests 8-1, 8-2 respectively. In use, the first and second channels 61-1, 61-2 provide an improved grip for a seat example, for example to facilitate changing between different seat configurations. By extending said first and second channels 61-1, 61-2 along the length of the first and second armrests 8-1, 8-2, they are available to the seat occupant irrespective of the configuration of the aircraft seat 1.

A further feature of the aircraft seat 1 described herein is that one or more storage compartment 62 (shown in FIG. 2) may be incorporated into one or both of the first and second armrest trim panels 11-1, 11-2. In the present embodiment, a storage compartment 62 is incorporated into the first armrest trim panel 11-1. The storage compartment 62 is intended to store a lifejacket (also known as a life vest) for emergency use. A removable front panel 63 having a grip tab 64 is provided to close the storage compartment 62.

Figure 11B:
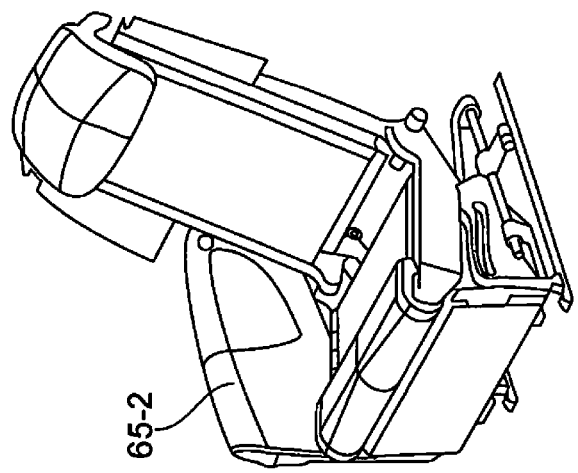
FIGS. 11A and 11B shows perspective views of a partial assembly of the aircraft seat.
Figure 11A:
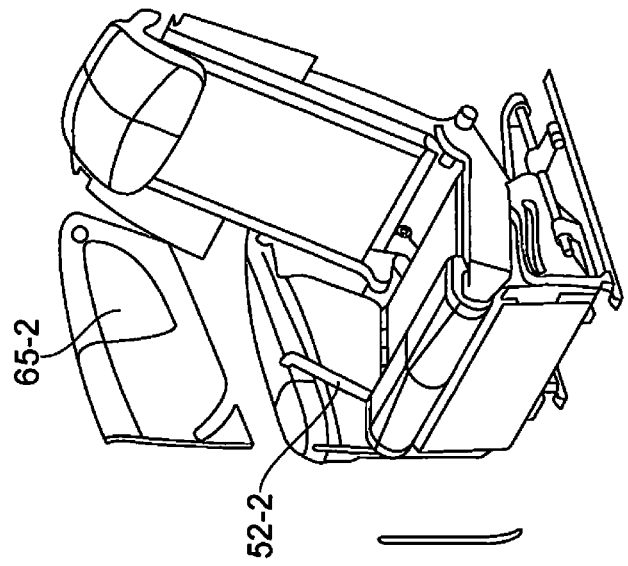
Figure 12:
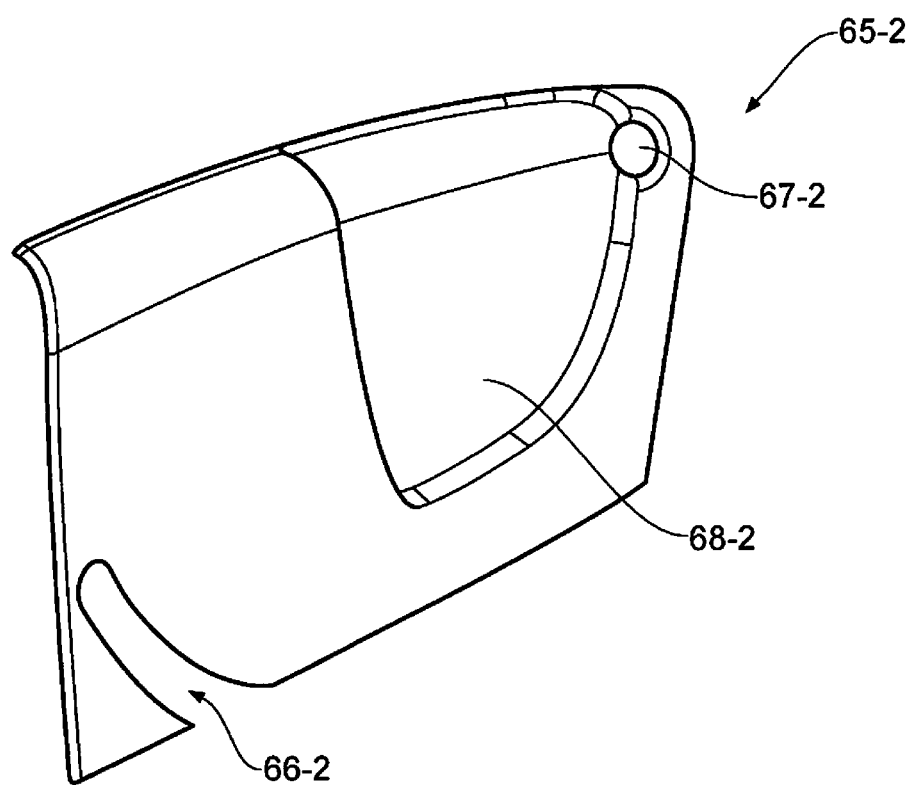
FIG. 12 shows a perspective view of the partial assembly shown in FIG. 14 with an armrest panel installed.

A perspective view of a partial assembly of the aircraft seat 1 is shown in FIGS. 11A and 11B. The first and second armrests 8-1, 8-2 comprise respective first and second inner armrest panels 65-2 (only the second inner armrest panel 65-2 is shown in the figures). The first and second inner armrest panels 65-2 are provided on the inside of the first and second armrests 8-1, 8-2 respectively and cover the armrest links 52-1, 52-2. The first and second inner armrest panels 65-2 have the same features and, for the sake of brevity, only the second inner armrest panel 65-2 is described herein. As shown in FIG. 12, the second inner armrest panel 65-2 comprises a second forward linkage slot 66-2 and a second rear linkage aperture 67-2. The second forward linkage slot 66-2 is arranged to accommodate the forward linkage pivotally connecting the second armrest link 52-2 and the second seat pan sidemember 26-2. The second armrest pivot pin 50 (which forms the fourth pivoting connection 49) extends through the second rear link aperture 67-2. In use, the second armrest 8-2 pivots about the second armrest pivot pin 50 as the aircraft seat 1 is re-configured between said seating configurations and/or said berthing configuration. It will be understood that the vertical height of the second armrest pivot pin 50 varies as the aircraft seat 1 is re-configured. Thus, the vertical position of the second armrest 8-2 changes depending on the configuration of the aircraft seat 1. The second forward linkage slot 66-2 accommodates the change in position and orientation of the second armrest 8-2 relative to the second seat pan sidemember 26-2. The second inner armrest panel 65-2 comprises a recessed section 68-2 for receiving padding, for example in the form of a foam pad (not shown), to improve comport. The first inner armrest panel 65-2 is configured to enable the same relative movement of the second armrest 8-2.

The seat pan pivot axis Y1, the seat back pivot axis Y2, the leg rest pivot axis Y3 and the armrest pivot axis Y4 are arranged substantially parallel to each other. Furthermore, when the seat chassis 4 is in a forward-facing (or a rear-facing) configuration, the seat pan pivot axis Y1, the seat back pivot axis Y2, the leg rest pivot axis Y3 and the armrest pivot axis Y4 are arranged substantially parallel to the transverse axis Y.

In the above embodiment, the aircraft seat 1 comprises a leg rest 9 which, in use, pivots between a lowered position and a raised position. In a variant, the aircraft seat 1 may comprise an extendible leg rest (denoted by the reference numeral 70). The extendible leg rest 70 is pivotally mounted to the first and second seat pan sidemembers 26-1, 26-2 and, in use, may pivot between the lowered position and the raised position. The extendible leg rest 70 can also be extended to increase the length thereof, for example when disposed in the raised position. As described herein, the extendible leg rest 70 in the present embodiment can be extended to a plurality of predefined extended positions. The extendible leg rest 70 in the present embodiment is configured selectively to engage one of the extended positions. In a variant, the extendible leg rest 70 could be infinitely adjustable, for example utilising a releasable friction brake. In the present embodiment, the extendible leg rest 70 is extended independently of the configuration of the aircraft seat 1. In a variant, the extendible leg rest 70 could be extended in dependence on the configuration of the aircraft seat 1. For example, the extendible leg rest 70 could be extended or retracted automatically as the aircraft seat 1 transitions between the seating configurations and/or the berthing configuration. The extendible leg rest 70 will now be described with reference to FIGS. 13 to 19.

Figure 13A:
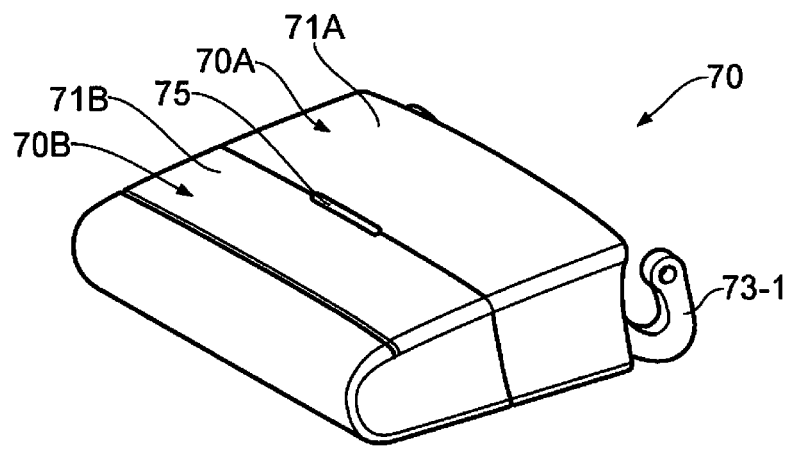
FIGS. 13A and 13B show perspective views of an extendible leg rest for the aircraft seat.
Figure 13B:
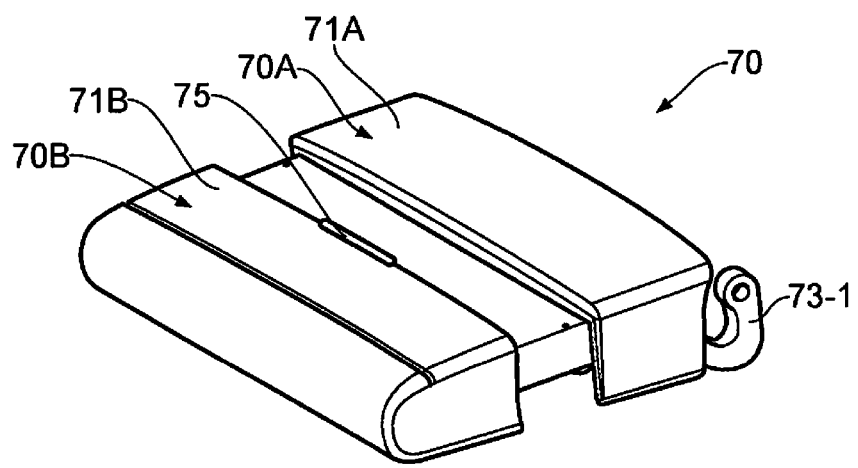

The extendible leg rest 70 comprises a base portion 70A and an extending portion 70B, as shown in FIGS. 13A and 13B. The extending portion 70B is configured to translate relative to the base portion 70A along a longitudinal axis to provide extended support for the legs of a seat occupant. In use, the extending portion 70B can be displaced from a stowed (or retracted) position (shown in FIG. 13A) to an extended position (shown in FIG. 13B). In the stowed position, the extending portion 70B is juxtaposed to the base portion 70A. In the extended position, the extending portion 70B is spaced apart from the base portion 70A. As shown in FIGS. 13A and 13B, the base portion 70A comprises a first leg support 71A; and the extending portion 70B comprises a second leg support 71B. A plan view of an underside of the extendible leg rest 70 with the extending portion 70B in the stowed position is shown in FIG. 14A; and a plan view of an underside of the extendible leg rest 70 with the extending portion 70B in the extended position is shown in FIG. 14B.

The base portion 70A comprises first and second leg rest sidemembers 72-1, 72-2 having first and second mounting arms 73-1, 73-2 for pivotally mounting the extendible leg rest 70 to the first and second seat pan sidemembers 26-1, 26-2. The first and second mounting arms 73-1, 73-2 comprise respective first and second cam tracks 74-1, 74-2 (shown in FIGS. 16A and 16B). As shown in FIG. 14A, the distal ends of the first and second mounting arms 73-1, 73-2 locate inside the extending portion 70B when the extending portion 70B is in the stowed position. The extendible leg rest 70 comprises a strike plate 75 for actuating the extending portion 70B. The strike plate 75 is provided on an upper surface of the extendible leg rest 70. In use, an actuating force is applied to the strike plate 75 to displace the extending portion 70B from the stowed position to the extended position. A seat occupant may, for example, use their heel to apply the actuating force to the strike plate 75. As described herein, the extendible leg rest 70 comprises means 76 for retracting the extending portion 70B from the extended position to the stowed position.

Figure 14A:
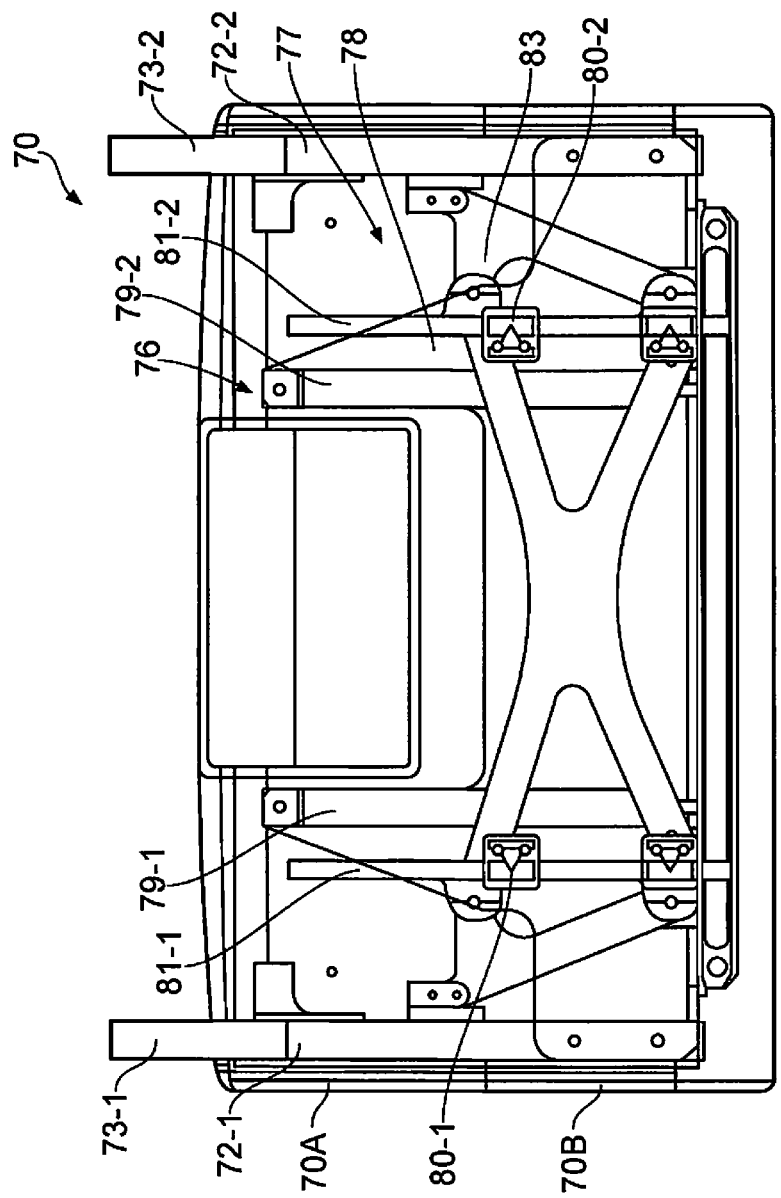
FIGS. 14A and 14B show a plan view of an underside of the extendible leg rest shown in FIGS. 13A and 13B.
Figure 14B:
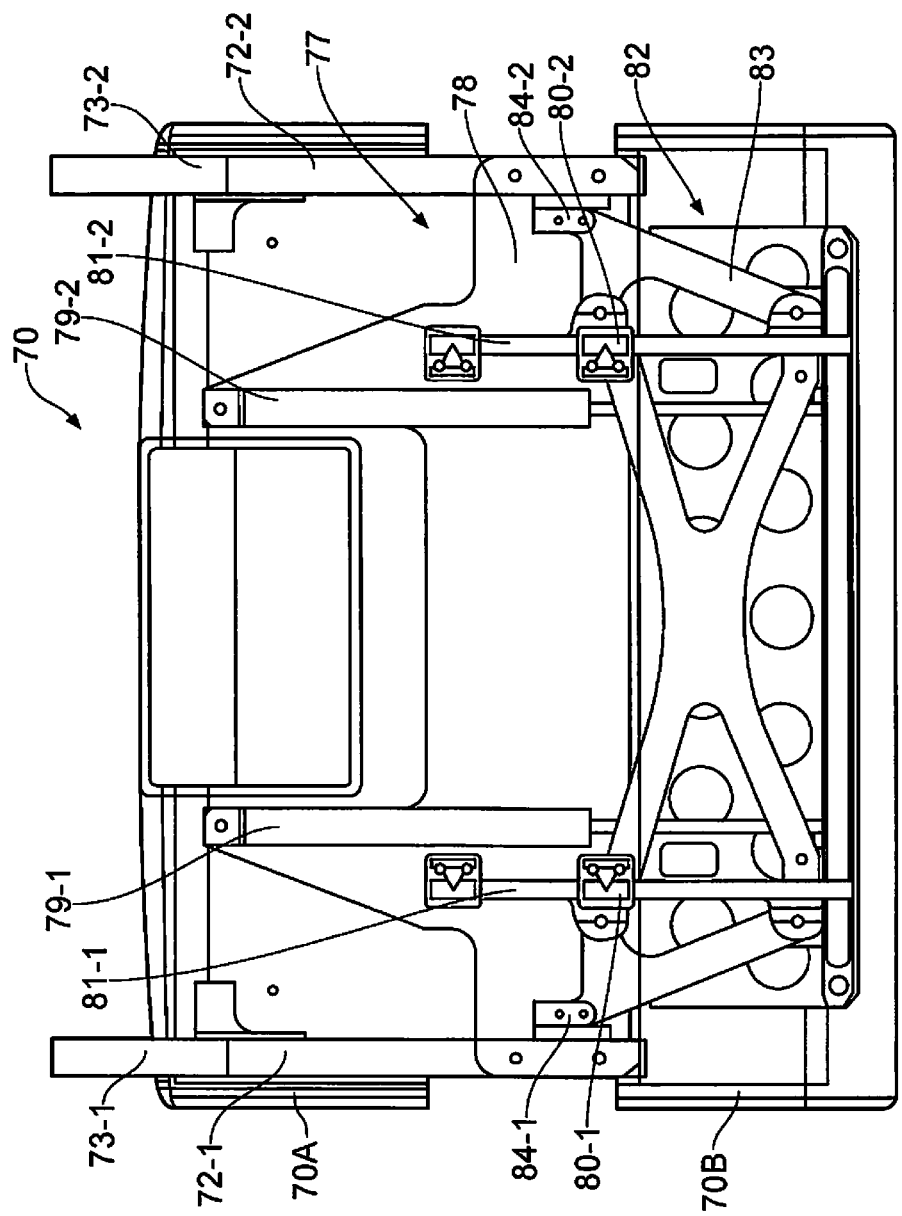

As shown in FIGS. 14A and 14B, the base portion 70A comprises a first sub-frame 77 for supporting the first leg support 71A. The first sub-frame 77 comprises a first transverse member 78 extending between the first and second leg rest sidemembers 72-1, 72-2. (The first transverse member 78 is shown in FIGS. 14A and 14B as being partially transparent to aid clarity.) In the present embodiment, the retracting means 76 comprises first and second tension gas springs 79-1, 79-2 fixedly mounted to the first sub-frame 76. The first and second tension gas springs 79-1, 79-2 are configured to apply a spring force for biasing the extending portion 70B towards the stowed position. First and second pairs of linear bearings 80-1, 80-2 are mounted to the first transverse member 78. The first and second pairs of linear bearings 80-1, 80-2 are configured to receive respective first and second rails 81-1, 81-2 mounted to the extending portion 70B.

Figure 15B:
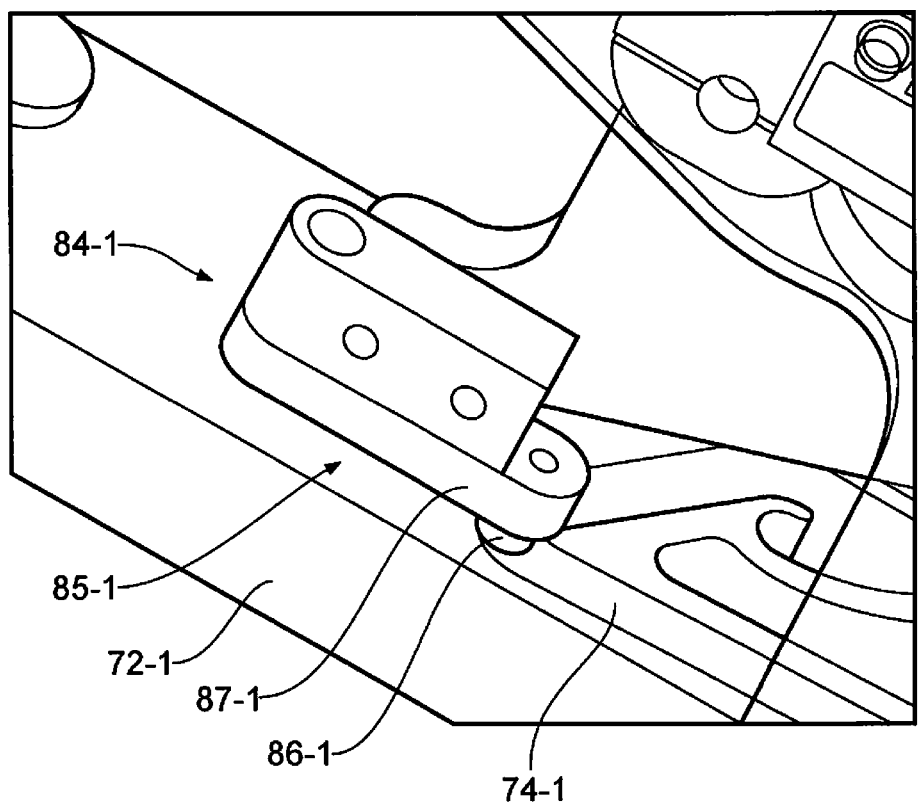
FIG. 15B shows an enlarged view of a cam follower assembly mounted to the extendible leg rest.

The extending portion 70B comprises a second sub-frame 82 for supporting the second leg support 71B. As shown in FIGS. 14A and 14B, the second sub-frame 82 comprises a second transverse member 83. The first and second rails 81-1, 81-2 are fixedly mounted to the second transverse member 83 and extend parallel to the longitudinal axis. As shown in FIG. 15A, the second sub-frame 82 locates inside the first sub-frame 77 in a nested configuration when the extendible leg rest 70 is in the stowed position. First and second roller arm assemblies 84-1, 84-2 are mounted on opposing sides of the second transverse member 83. The first and second roller arm assemblies 84-1, 84-2 comprise respective first and second cam follower assemblies 85-1, 85-2. The first and second cam follower assemblies 85-1, 85-2 have the same configuration and only the first cam follower assembly 85-1 is described herein. A perspective view of an underside of the extendible leg rest 70 is shown in FIG. 15A; and an enlarged view of the first cam follower assembly 85-1 is shown in FIG. 15B. The first cam follower assembly 85-1 comprises a first cam follower 86-1 mounted on a first roller arm 87-1. In the present embodiment, the first cam follower 86-1 comprises a roller. The first cam follower 86-1 is configured to travel in the first cam track 74-1 formed in the first leg rest sidemember 72-1. The first cam follower arm 87-1 is pivotally mounted to enable vertical movement of the first cam follower 86-1 within the first cam track 74-1. A torsion spring (not shown) is provided to bias the first cam follower arm 87-1 towards a neutral position. In the present embodiment, the first cam follower arm 87-1 extends in a substantially horizontal orientation when in the neutral position. It will be understood that the first cam follower 85-1 cooperates with the first cam track 74-1 formed in the first leg rest sidemember 72-1.

The first and second cam track 74-1, 74-2 are configured to define the extended positions of the extendible leg rest 70. In the present embodiment, the first and second cam track 74-1, 74-2 define three (3) intermediate extended positions and a fully extended position. The first and second cam track 74-1, 74-2 are formed on opposing sides of the extendible leg rest 70 and have the same configuration as each other. For the sake of brevity, only the first cam track 74-1 will now be described.

Figure 16:
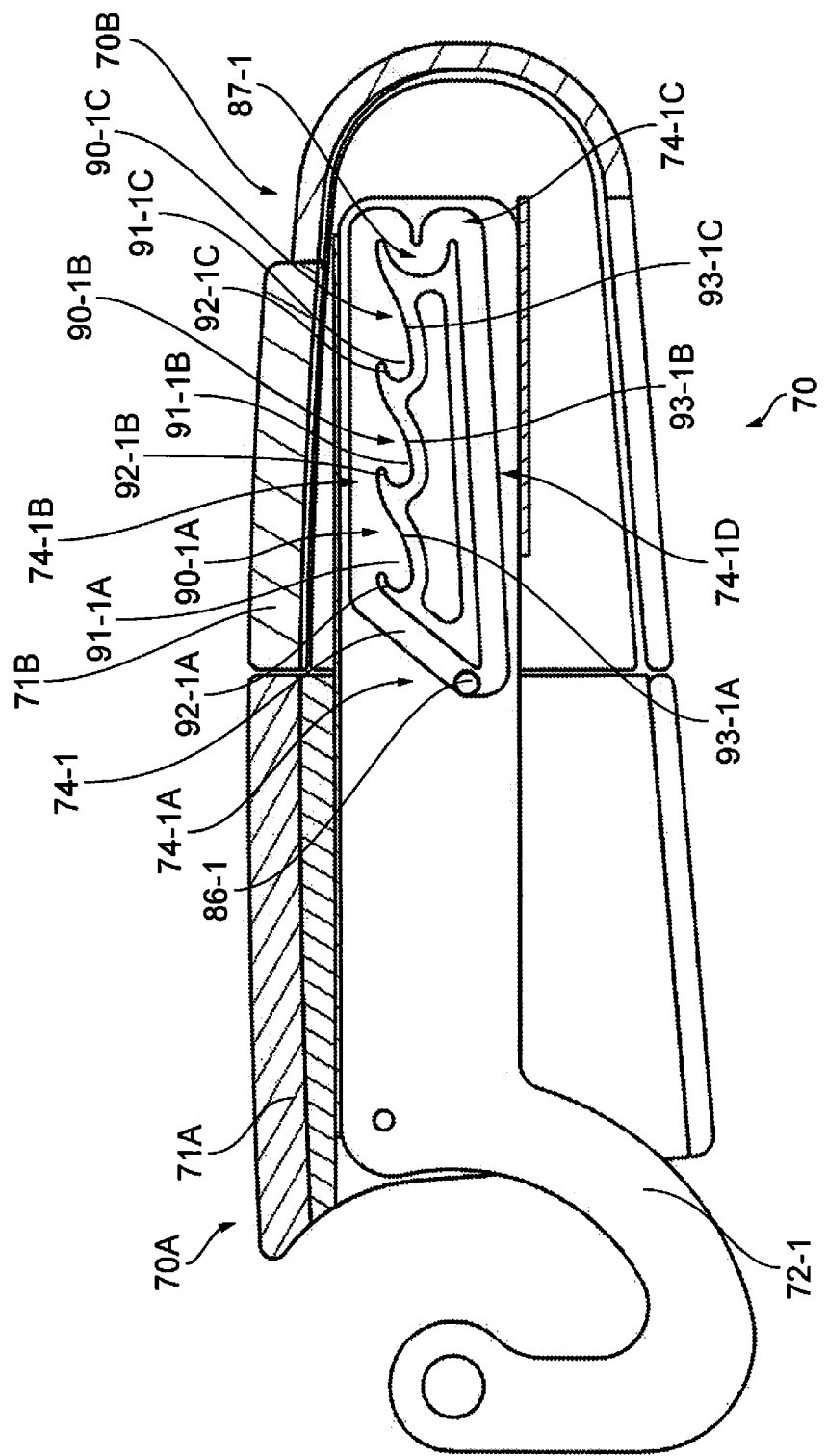
FIG. 16 shows a longitudinal sectional view of the extendible leg rest shown in FIGS. 13A and 13B.

A side elevation of the first leg rest sidemember 72-1 and the first cam track 74-1 is shown in FIG. 16. The first cam track 74-1 comprises an endless track (i.e. a continuous loop) in which the first cam follower 85-1 travels. The first cam track 74-1 comprises a first aft portion 74-1A, a first upper portion 74-1B, a first forward portion 74-1C and a first lower portion 74-1D. The aft portion 74-1A comprises an inclined ramp for guiding the first cam follower 85-1 onto the upper portion 74-1B. The upper portion 74-1B is configured to guide the first cam follower 85-1 as the extending portion 70B is displaced from the stowed position to the extended position. The forward portion 74-1C is configured to guide the first cam follower 85-1 from the upper portion 74-1B to the lower portion 74-1D. The forward portion 74-1C is configured to guide the first cam follower 85-1 from the upper portion 74-1B to the lower portion 74-1D. In the present embodiment, the forward portion 74-1C comprises a first end recess 87-1 for defining the fully extended position for the extending portion 70B. The end recess 87-1 in the illustrated arrangement comprises a U-shaped section.

The upper portion 74-1B comprises first, second and third recesses 90-1A, 90-1B, 90-1C arranged in a sequence to define the intermediate extended positions of the extendible leg rest 70. As shown in FIG. 17, the recesses 90-1A, 90-1B, 90-1C each comprise a locating aperture 91-1A, 91-1B, 91-1C in which the first cam follower 85-1 seats when the extendible leg rest 70 is disposed in the first, second and third intermediate extended positions respectively. In use, the retracting means 76 is operable to bias the first cam follower 85-1 into the locating apertures 91-1A, 91-1B, 91-1C, thereby retaining the extending portion 70B in each intermediate extended position. In order to displace the extending portion 70B to the next intermediate extended position, the user applies an actuating force to overcome the spring force generated by the retracting means 76. The upper portion 88-2 comprises first, second and third wall projections 92-1A, 92-1B, 92-1C extending in a longitudinal direction partially across the top of the respective locating apertures 91-1A, 91-1B, 91-1C. The first, second and third wall projections 92-1A, 92-1B, 92-1C inhibit vertical movement of the first cam follower 85-1 when located in the locating apertures 91-1A, 91-1B, 91-1C. The recesses 90-1A, 90-1B, 90-1C each comprise a guide surface 93-1A, 93-1B, 93-1C for guiding the first cam follower 85-1. The guide surface 93-1A, 93-1B, 93-1C have a substantially continuous profile and, in use, are operable to guide the first cam follower 85-1 to the next locating aperture 91-1A, 91-1B, 91-1C in the sequence. The guide surface 93-1C associated with the third recess 90-1C is configured to guide the first cam follower 85-1 into the end recess 87-1 such that the extending portion 70B is located in the fully extended position.

Figure 17A:
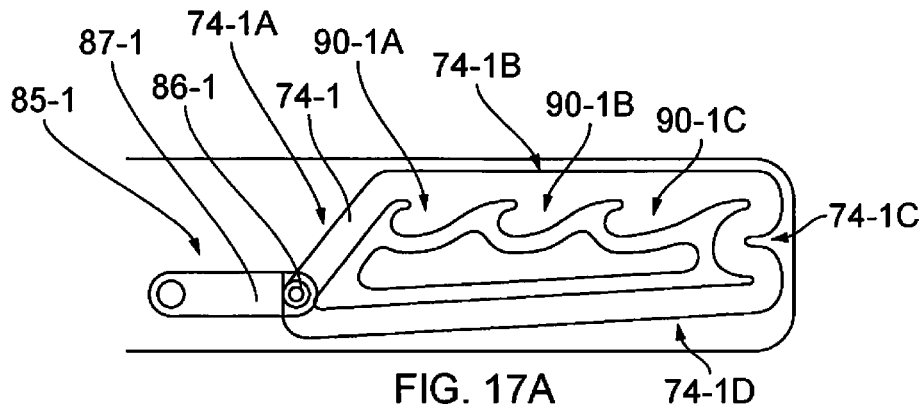
FIGS. 17A-K illustrate movement of the cam follower in a cam track as the extendible leg rest is re-configured.
Figure 17B:
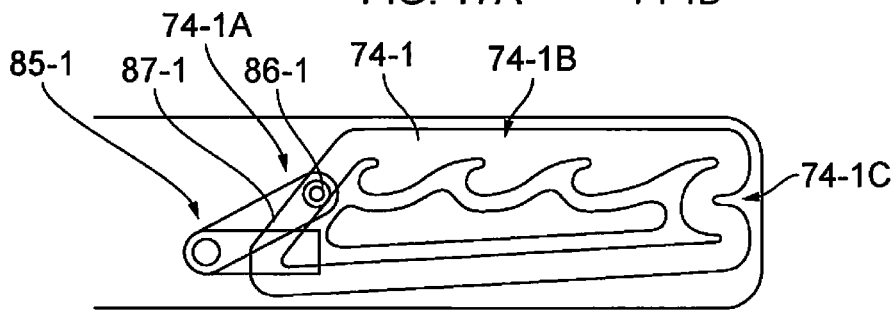
Figure 17C:
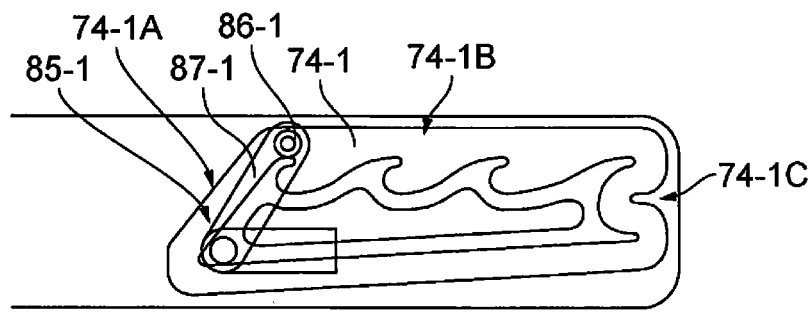
Figure 17D:
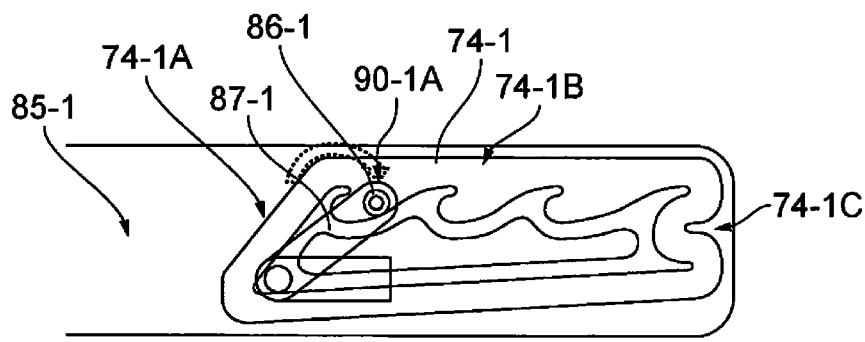
Figure 17E:
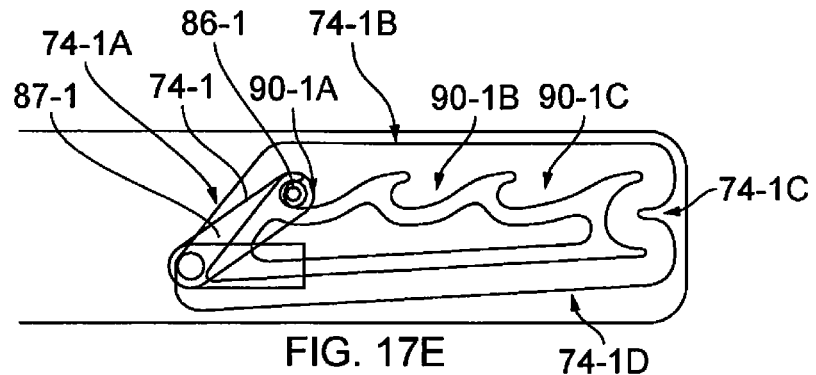
Figure 17F:
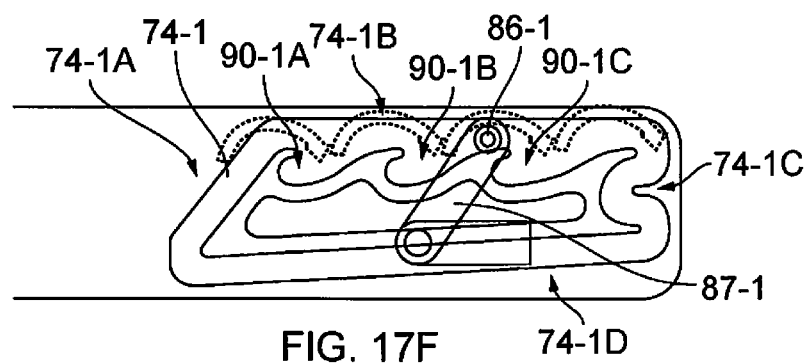
Figure 17G:
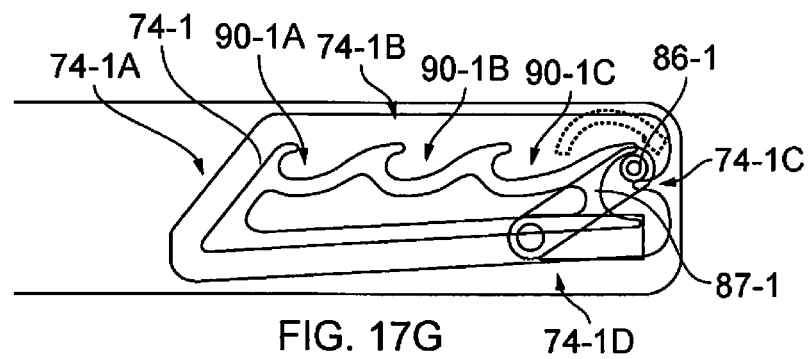
Figure 17H:
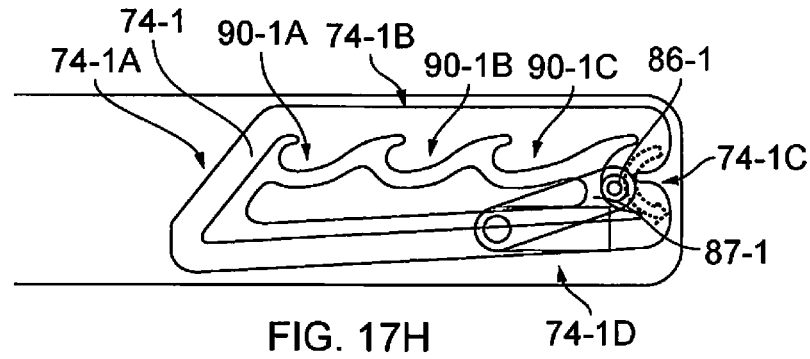
Figure 17I:
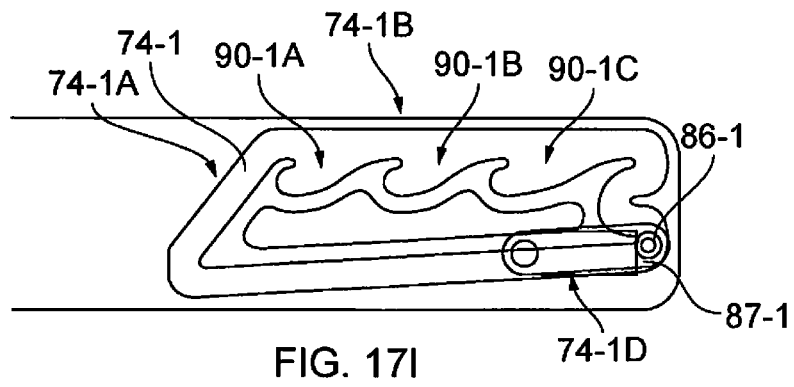
Figure 17J:
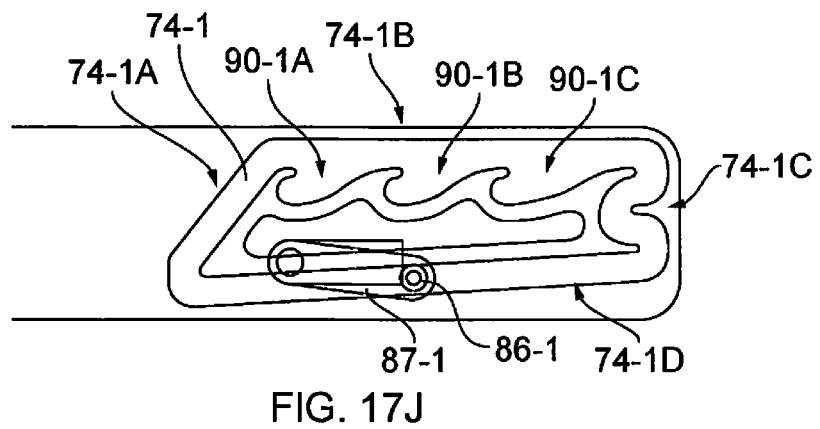
Figure 17K:
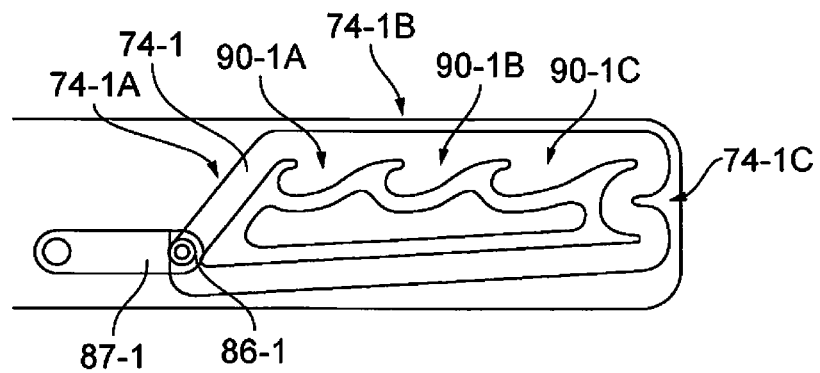

The operation of the extending leg rest 70 will now be described. The movement of the first cam follower 85-1 in the first cam track 74-1 will now be described with reference to FIGS. 18A-K. It will be understood that the movement of the first cam follower in the first cam track 74-1 mirrors the movement of the first cam follower 85-1. When the extending portion 70B is in the stowed position, the first cam follower 85-1 is disposed in a neutral position in the aft portion 74-1A, as shown in FIG. 17A. The user applies an actuating force to the extending portion 70A to displace the extending portion 70B from the stowed position. As shown in FIG. 17B, the first cam follower 85-1 rises along the aft portion 74-1A as the extending portion 70B travels forwards on the linear bearings 80-1, 80-2. The first cam follower 85-1 ascends the aft portion 74-1A and travels over the first wall projection 92-1A, as shown in FIG. 17C. The torsion spring biases the second roller arm 87-1 in a downwards direction, thereby biasing the first cam follower 85-1 onto the guide surface 93-1A associated with the first recess 90-1A, as shown in FIG. 17D. The spring force applied by the retracting means 76 to the extending portion 70B biases the first cam follower 85-1 into a seated position in the first locating aperture 83-1A, as shown in FIG. 17E. The extending portion 70B is thereby located in the first intermediate extended position. To displace the extending portion 70B to the second intermediate extended position, the user applies an actuating force to overcome the spring force applied by the retracting means 76. The first cam follower 85-1 travels along the guide surface 93-1A and seats in the second and third locating aperture 83-1B, 83-1C in sequence, as illustrated by the arrows A1 shown in FIG. 17F. The first cam follower 85-1 travels along the guide surface 93-1C associated with the third recess 90-1C to seat the first cam follower 85-1 into the end recess 87-1, as shown in FIG. 17G. The spring force applied by the retracting means 76 seats the first cam follower 85-1 in the end recess 87-1, as shown in FIG. 17H. In order to return the extending portion 70B to the stowed position, the seat occupant displaces the extending portion 70B forwards beyond the fully extended position. The first cam follower 85-1 is unseated from the end recess 87-1 and the torsion spring biases the first cam follower 85-1 downwardly into the lower portion 74-1D, as shown in FIG. 17I. The first cam follower 85-1 is free to travel along the lower portion 74-1D, as shown in FIG. 17J. The spring force applied by the retracting means 76 returns the first cam follower 85-1 to a neutral position at the base of the first portion 74-1A with the extending portion 70B in the stowed position.

An aircraft seat 101 in accordance with a further embodiment of the present invention will now be described with reference to FIGS. 18, 19, 20 and 21. The same reference numerals are used for like components, but are increased by 100 for the sake of clarity. The aircraft seat 101 is a development of the aircraft seat 1 and the description herein focuses on the differences.

Figure 18:
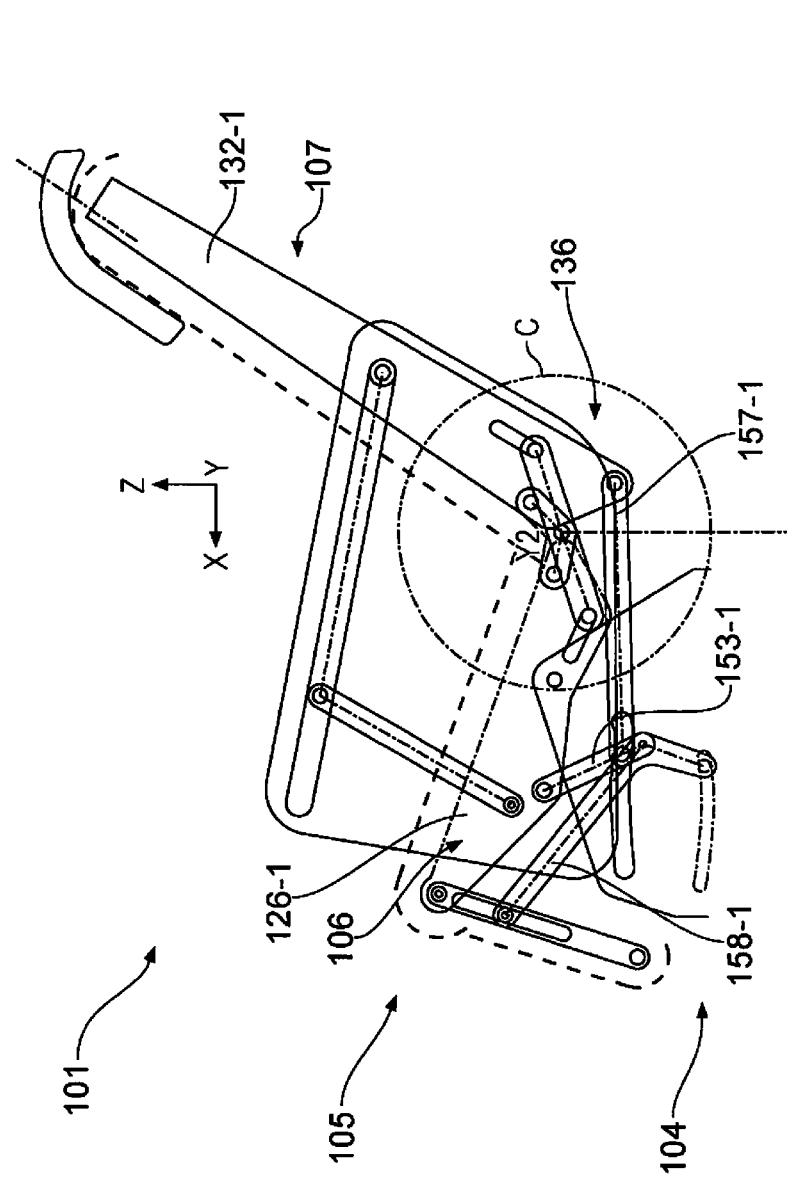
FIG. 18 shows a schematic representation of an aircraft seat according to a further embodiment of the present invention.
Figure 20:
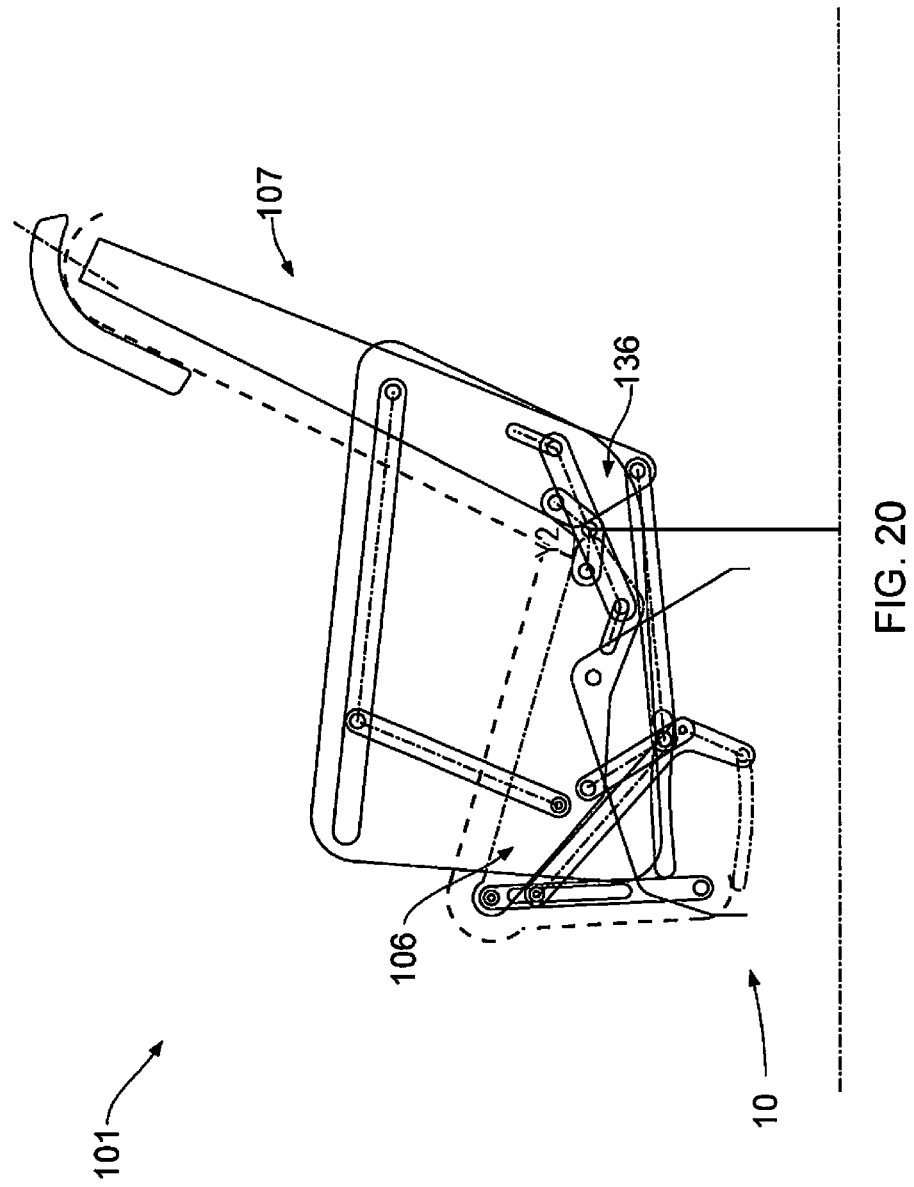
FIG. 20 shows the aircraft seat shown in FIG. 18 in a take-off, taxi and landing (TTL) configuration.
Figure 21:
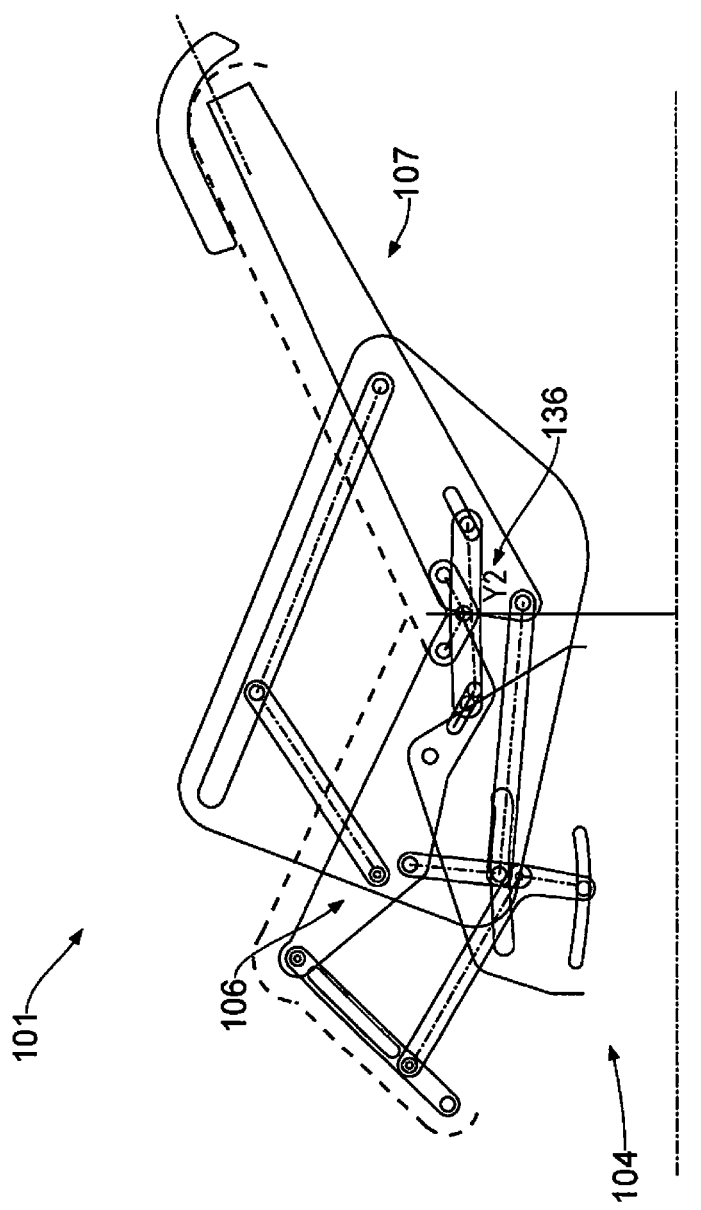
FIG. 21 shows the aircraft seat shown in FIG. 20 in a reclined configuration.
Figure 22A:
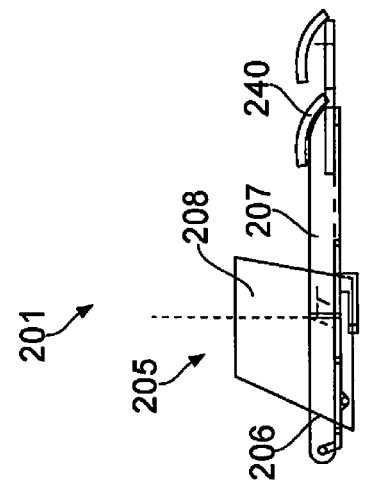
FIGS. 22A-C show an aircraft seat in accordance with a further embodiment in seating and berthing configurations.
Figure 22B:
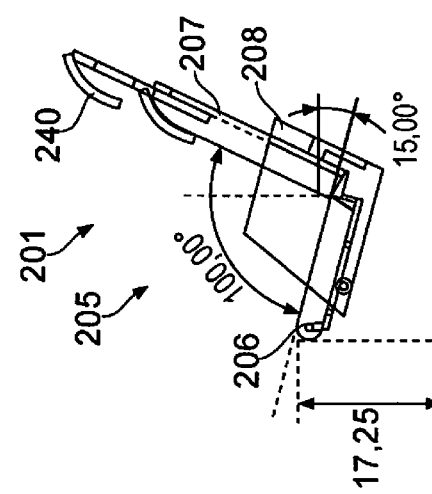
Figure 22C:
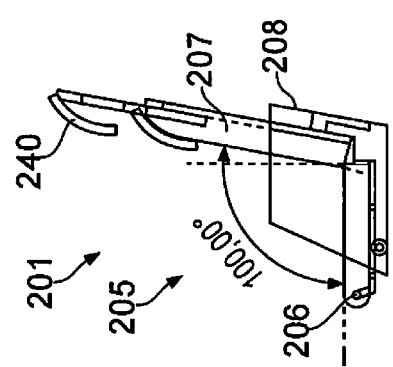

The aircraft seat 101 is shown in a partially reclined configuration in FIG. 18; a take-off, taxi and landing (TTL) configuration in FIG. 20; and a reclined configuration in FIG. 21. When the aircraft seat 101 is in the reclined configuration shown in FIG. 21, the seat assembly 105 may be at least partially balanced and this may be referred to as a "Zero G" position. The aircraft seat 101 is described in relation to a seat reference frame comprising a longitudinal axis X, a transverse axis Y and a vertical axis Z.

As shown in FIG. 18, the aircraft seat 101 comprises a seat base (not shown), a seat chassis 104 and a seat assembly 105. The seat assembly 105 comprises a seat pan 106; a seat back 107; first and second armrests 108-1, 108-2; and a leg rest 109. The configuration of the seat pan 106 and the seat back 107 are substantially unchanged from those of the aircraft seat 1. The seat pan 106 comprises first and second seat pan sidemembers 126-1, and front and rear transverse tubes (not shown). The seat back 107 comprises first and second seat back sidemembers 132-1 disposed on respective sides of the seat back 7. The seat back 107 is mounted to the seat pan 106 by a second pivoting connection (denoted generally by the reference numeral 136) having a seat back pivot axis Y2. The configuration of the second pivoting connection 136 is modified in the aircraft seat 101 and these changes will now be described in more detail herein with particular reference to FIG. 19.

The second pivoting connection 136 comprises first and second hinges assemblies 170-1, disposed on opposing sides of the aircraft seat 101. The first and second hinges assemblies 170-1 are arranged such that the seat back pivot axis Y2 is substantially parallel to the transverse axis Y. The first and second hinges assemblies 170-1 are scissor-type hinges configured such that the location of the seat back pivot axis Y2 is not fixed relative to the seat pan 106. Rather, the location of the seat back pivot axis Y2 undergoes translation in dependence on the incline angle of the seat back 107. The first and second hinges assemblies 170-1 have the same general configuration as each other and the description herein focuses on the first hinge assembly 170-1 for the sake of brevity.

Figure 19:
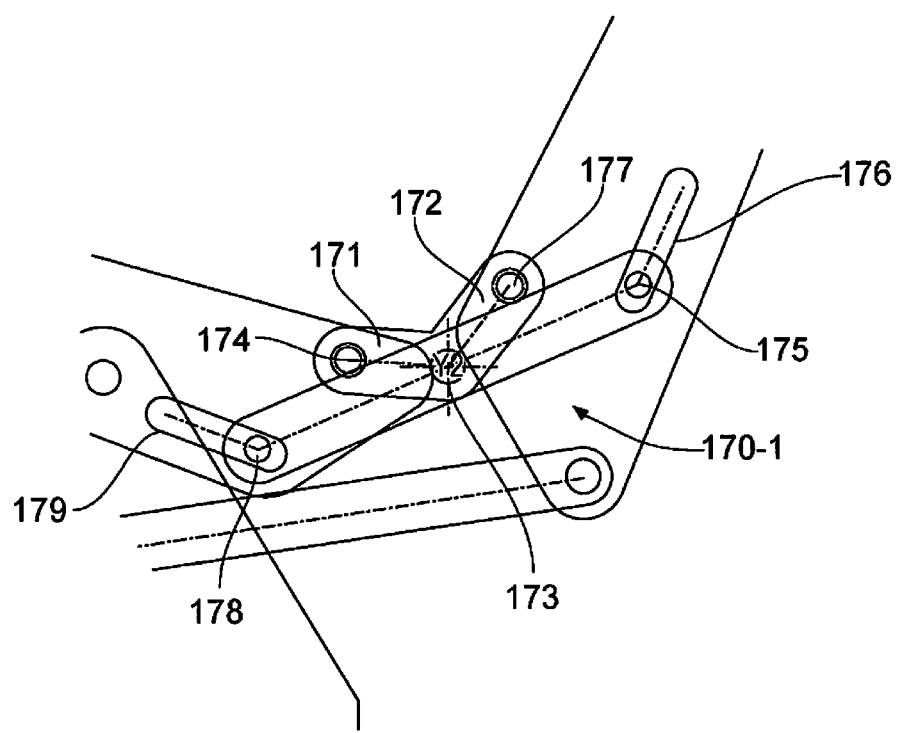
FIG. 19 shows an enlarged view of the hinge arrangement of the aircraft seat shown in FIG. 18.

As shown in FIG. 19, the first hinge assembly 170-1 comprises a first seat pan hinge link 171 and a first seat back hinge link 172 which are pivotally connected to each other by a first pivot pin 173. The first pivot pin 173 defines the seat back pivot axis Y2 about which the seat back 107 pivots. The first seat pan hinge link 171 and the first seat back hinge link 172 have substantially the same shape as each other, but are oriented in opposite directions within the first hinge assembly 170-1. The first seat pan hinge link 171 comprises a first arm 171A and a second arm 171B which are inclined at an obtuse angle relative to each other. The first arm 171A of the first seat pan hinge link 171 is shorter than the second arm 171B of the first seat pan hinge link 171. A first hole is formed in the first seat pan hinge link 171 between said first and second arms 171A, 171B to receive the first pivot pin 173. The first seat back hinge link 172 comprises first and second arms 172A, 172B which are inclined at an obtuse angle relative to each other. The first arm 172A of the first seat back hinge link 172 is shorter than the second arm 172B of the first seat back hinge link 172. A second hole is formed in the first seat back hinge link 172 between said first and second arms 172A, 172B to receive the first pivot pin 173. It will be understood that the first seat pan hinge link 171 may comprise more than one first seat pan hinge link 171 and/or more than one first seat back hinge link 172. For example, the first seat pan hinge link 171 may comprise two of said first seat pan hinge links 171 and two of said first seat back hinge links 172 alternating with each other along the first pivot pin 173.

The first arm 171A of the first seat pan hinge link 171 is pivotally connected to a first seat base pin 174 fixedly mounted to the first seat pan sidemember 126-1. A first guide member 175 is mounted to the second arm 171B of the first seat pan hinge link 171 and arranged to travel in a first seat back track 176 formed in the first seat back sidemember 132-1. The first guide member 175 in the present embodiment comprises a first guide pin. The first arm 172A of the first seat back hinge link 172 is pivotally connected to a first seat back pin 177 fixedly mounted to the first seat back sidemember 132-1. A second guide member 178 is mounted to the second arm 172B of the first seat back hinge link 172 and arranged to travel in a first seat pan track 179 formed in the first seat pan sidemember 126-1. The second guide member 178 in the present embodiment comprises a second guide pin. The second arm 171B of the first seat pan hinge link 171 is partially received in the seat back 107; and the second arm 172B of the first seat back hinge link 172 is partially received in the seat pan 106. In the present embodiment the first seat back track 176 and the first seat pan track 179 each comprise a linear track having a central longitudinal axis. The central longitudinal axes of the first seat back track 176 and the first seat pan track 179 are substantially perpendicular to each other when the aircraft seat 101 is in the TTL configuration; and are substantially aligned with each other when the aircraft seat 101 is in the berthing configuration.

The first hinge assembly 170-1 has a line of symmetry (extending through the seat back pivot axis Y2) about which the first seat pan hinge link 171 and the first seat back hinge link 172 are symmetrical. This symmetry is maintained irrespective of the angular position of the first seat pan hinge link 171 and the first seat back hinge link 172 relative to each other. However, the vertical and longitudinal position of the seat back pivot axis Y2 changes in dependence on the relative angular position of the first seat pan hinge link 171 and the first seat back hinge link 172. Notably, the seat back pivot axis Y2 is displaced downwardly as the incline angle of the seat back 107 increases. When the aircraft seat 101 is in the berthing configuration, the seat back pivot axis Y2 is in its lowermost vertical position. This vertical displacement helps to maintain the first hinge assembly 170-1 clear of the upper surface of the seat pan 106.

As outlined above, the second hinge assembly 170-2 has the same configuration as the first hinge assembly 170-1. In particular, the second hinge assembly 170-2 comprises a second seat pan hinge link and a second seat back hinge link which are pivotally connected to each other by a second pivot pin. The mounting arrangement of the second seat pan hinge link and the second seat back hinge link to the seat pan 106 and the seat back 107 is the same as for the first hinge assembly 170-1. The first pivot pin 173 is aligned with the second pivot pin along said seat back pivot axis Y2.

The aircraft seat 101 is controlled by first and second aircraft seat pan links 153-1 connected to the seat pan 106; first and second recline links 157-1 connected to the seat back 7; and first and second leg rest links 158-1. The configuration of the control links is substantially unchanged from the first embodiment described herein. The operation of the second pivoting connection 136 as the aircraft seat 101 is reconfigured will now be described with reference to FIGS. 11, 13 and 14. When the aircraft seat 101 is disposed in said TTL configuration, the first and second guide members 178 are located at or proximal to the ends of the first seat back track 176 and the first seat pan track 179 respectively which are closest to the seat back pivot axis Y2. As the incline angle of the seat back 107 is increased, the first and second guide members 175, 178 travel along the first seat back track 176 and the first seat pan track 179 towards the opposite ends thereof. When the aircraft seat 101 is in said berthing configuration (not shown), the first and second guide members 175, 178 are disposed at or proximal to the ends of the first seat back track 176 and the first seat pan track 179 which are distal from the seat back pivot axis Y2.

As described herein, the first pivot pin 173 and the second pivot pin are aligned with each other along the seat back pivot axis Y2 about which the seat back 107 pivots.

A first guide member 175 is mounted to the second arm 171B of the first seat pan hinge link 171 and arranged to travel in a first seat back track 176 formed in the first seat back sidemember 132-1. A second guide member 178 is mounted to the second arm 172B of the first seat back hinge link 172 and arranged to travel in a first seat pan track 179 formed in the first seat pan sidemember 126-1.

An aircraft seat 201 in accordance with a further embodiment of the present invention will now be described with reference to FIGS. 22 to 25. The aircraft seat 201 is a development of the aircraft seat 1 and the description herein focuses on the differences. Like reference numerals are used for like components but are increased by 200 for the sake of clarity.

The aircraft seat 201 is selectively configurable in at least first and second seating configurations, such as a take-off, taxi and landing (TTL) and a reclined configuration. The aircraft seat 201 defines a fixed hip angle in the first and second seating configurations. The aircraft seat 201 is also selectively configurable in a berthing configuration. The aircraft seat 201 is shown in the TTL configuration in FIG. 22A and FIG. 23; the reclined configuration in FIGS. 22B and 24; and the berthing configuration in FIGS. 22C and 25. The aircraft seat 201 is suitable for working/dining at a table 280 when disposed in the TTL configuration. In the reclined configuration, the aircraft seat 201 is reclined by approximately 15° (relative to the orientation in the TTL configuration). The aircraft seat 201 may provide improved comfort when disposed in the reclined configuration. In the berthing configuration, the aircraft seat 201 is in a substantially horizontal configuration.

Figure 23:
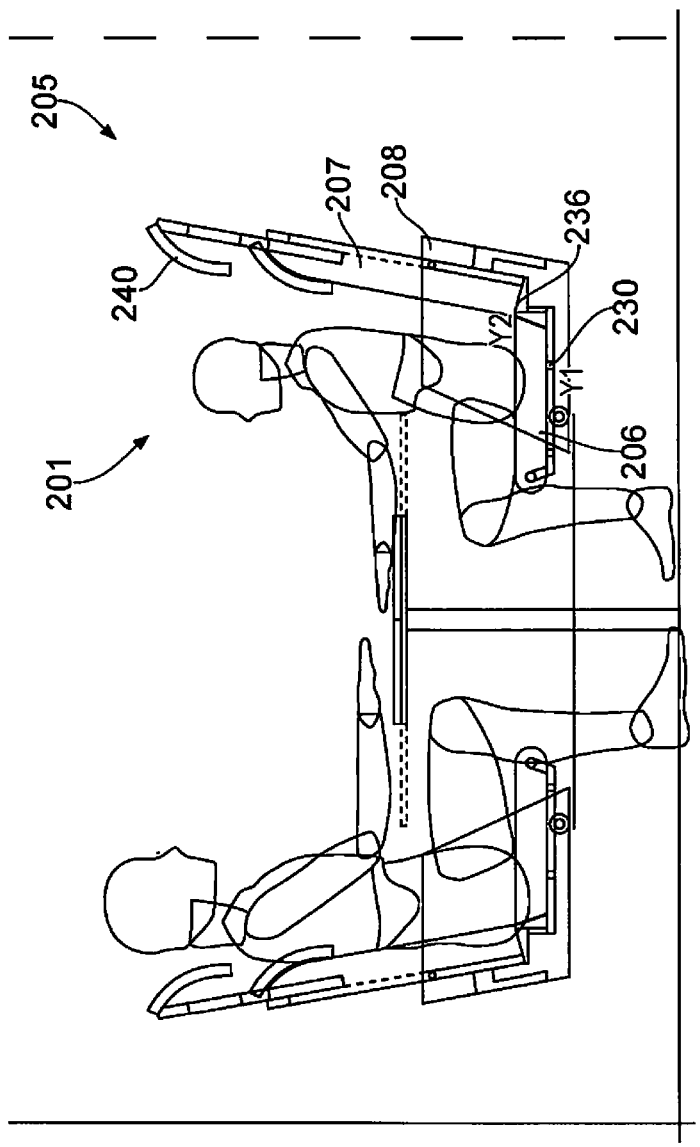
FIG. 23 shows the aircraft seat according to the further embodiment in a TTL configuration.
Figure 24:
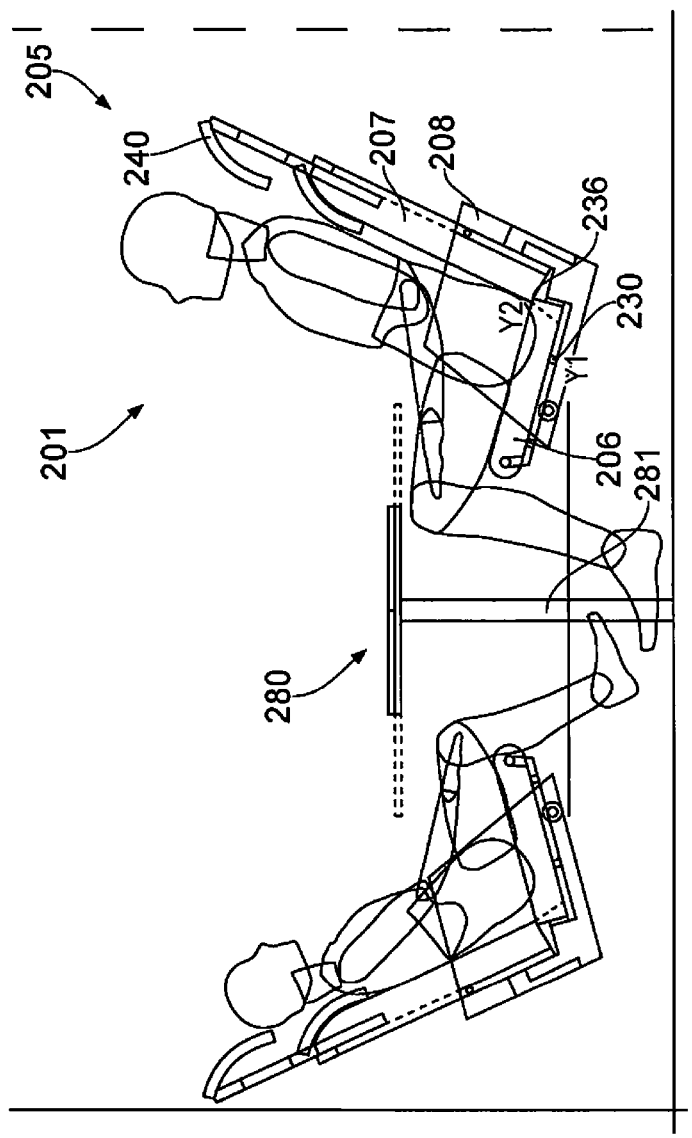
FIG. 24 shows the aircraft seat according to the further embodiment in a reclined configuration.

The aircraft seat 201 comprises a seat base (not shown), a seat chassis (not shown) and a seat assembly 205. As shown in FIG. 23, the seat assembly 205 comprises a seat pan 206; a seat back 207, an armrest 208 and a head rest 240. The seat assembly 205 may optionally also comprise a leg rest (not shown). The seat back 207 is mounted to the seat pan 106 by a second pivoting connection (denoted generally by the reference numeral 236) defining a seat back pivot axis Y2. The armrest 208 is fixedly mounted to the seat pan 206 such that the seat pan 206 and the armrest 208 pivot together. The seat chassis may be configured to enable longitudinal tracking (i.e. translation) of the aircraft seat 201, for example to enable forward and rearward movement of the seat assembly 205.

The seat pan 206 is mounted to the seat chassis by a first pivoting connection 230 defining a seat pan pivot axis Y1 about which the seat pan 206 pivots. The location of the seat pan pivot axis Y1 is fixed relative to the seat chassis. The seat pan 206 is disposed in a substantially horizontal orientation (i.e. substantially parallel to a floor of the aircraft) in the TTL configuration and the berthing configuration. The seat pan 206 pivots through a recline angle as it transitions from the TTL configuration to the reclined configuration. The recline angle in the present embodiment is defined as approximately 15°, but other recline angles may be defined. Alternatively, the recline angle may be adjustable, for example the recline angle may be infinitely variable. The seat pan 206 and the seat back 207 are disposed in a substantially horizontal configuration (i.e. substantially parallel to a floor of the aircraft) in the berthing configuration. Thus, the seat pan 206 pivots back to the original position as the aircraft seat transitions from the reclined configuration to the berthing configuration.

The pivoting of the seat pan 206 about the seat pan pivot axis Y1 may be controlled by a seat pan link (not shown). The seat pan link may be connected to the seat pan 206 in front of the seat pan pivot axis Y1. The seat pan 206 and the seat back 207 are in a fixed orientation relative to each other when the aircraft seat 201 is in a seating configured, such as the TTL configuration and the reclined configuration. Thus, the seat pan 206 and the seat back 207 pivot between the TTL configuration and the reclined configuration in a fixed configuration. In the present embodiment, the seat pan 206 and the seat back 207 are oriented at an angle of approximately 100° relatively to each other. At least in certain embodiments, fixing the orientation of the seat back 207 relative to the seat pan 206 may reduce the complexity of the seat chassis.

The seat back 207 is pivotable relative to the seat pan 206 as it is reconfigured into the berthing configuration. The orientation of the seat back 207 relative to the seat pan 206 may be controlled by the seat chassis, for example by one or more recline control arm (not shown). Alternatively, or in addition, a releasable locking mechanism (not shown) may be provided for selectively fixing the position of the seat back 207 relative to the seat pan 206. The locking mechanism may be released to re-configure the aircraft seat 201 in the berthing configuration.

The head rest 240 in the present embodiment is extendible. In particular, the height of the head rest 240 is adjustable relative to the seat back 207. As shown in FIG. 17, the head rest 240 is extended when the aircraft seat 201 is in the TTL configuration and the reclined configuration. As shown in FIG. 18, the head rest 240 is retracted when the aircraft seat 201 is in the berthing configuration. The head rest 240 may be connected to the recline mechanism so as to extend and/or retract automatically as the aircraft seat 201 transitions between different configurations. A head rest link (not shown) could, for example, be connected to the recline control arm. Alternatively, a separate actuating mechanism may be provided for extending and retracting the head rest 240.

Figure 25:
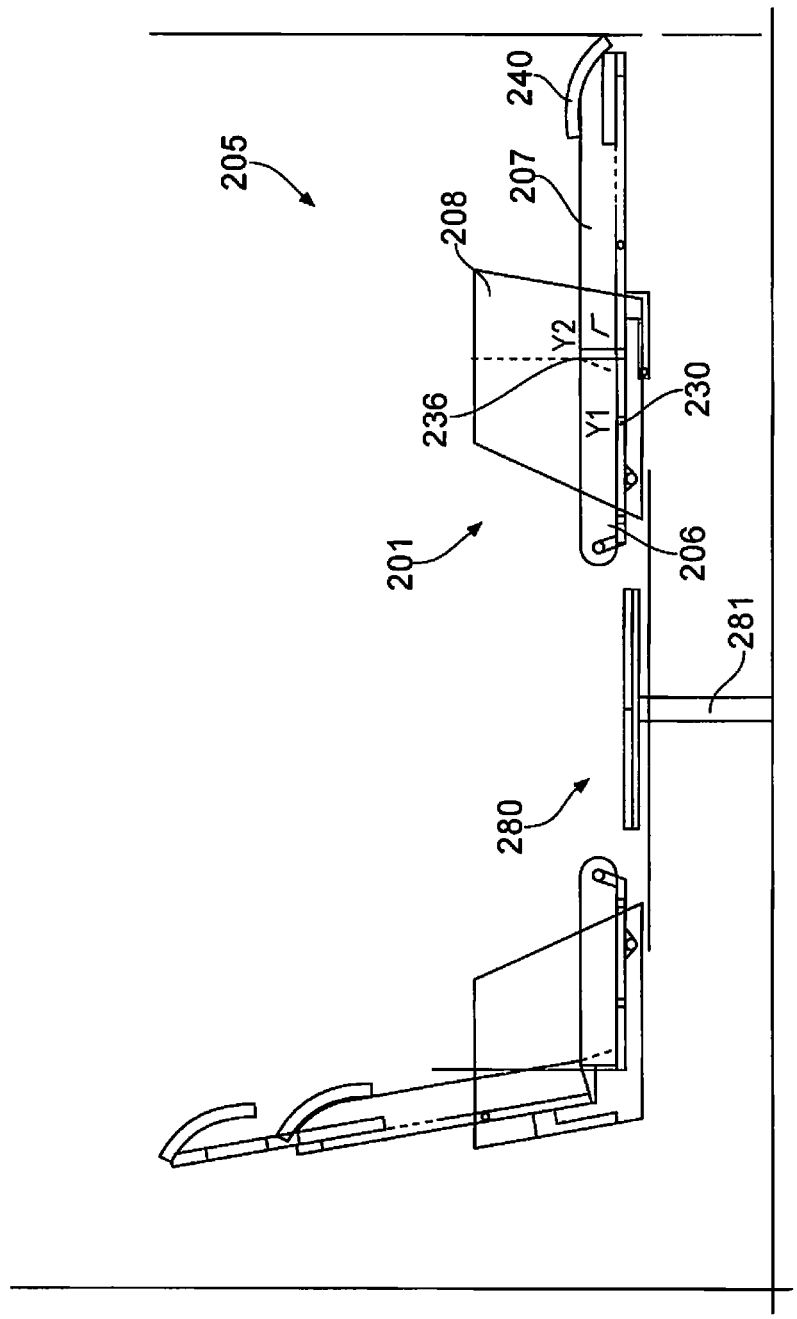
FIG. 25 shows the aircraft seat according to the further embodiment in a berthing configuration.

As outlined above, the armrest 208 pivots with the seat pan 206. The vertical height of the armrest 208 could be adjustable. For example, the aircraft seat 201 could incorporate the adjustable armrest mechanism described herein with reference to FIGS. 11 and 12. As shown in FIG. 25, the vertical height of the table 280 may be adjustable to form an extension of the aircraft seat 201 in the berthing configuration. The table 280 may comprise an adjustable support member, such as a folding or telescopic leg 281. In use, a cushion or padded support may optionally be placed on the table 280 to extend the aircraft seat 201 in the berthing configuration.

It will be appreciated that various modifications may be made to the embodiment(s) described herein without departing from the scope of the appended claims.

In the embodiments described herein the seat pan 6, the seat back 7 and the leg rest 9 are connected so as to move together. The aircraft seat 1 may be modified to enable one or more of the seat pan 6, the seat back 7 and the leg rest 9 to be decoupled. For example, the seat back 7 and/or the leg rest 9 may be decoupled from the seat pan 6. When decoupled from the seat pan 6, the seat back 7 and/or the leg rest 9 may be adjusted independently. In order to decouple the seat back 7, the first and second recline links 57-1 may each comprise a decoupling mechanism, such as a lockable gas spring, which may be released to decouple the seat back 7 from the seat pan 6. In order to decouple the leg rest 9, the first and second leg rest links 58-1 may each comprise a decoupling mechanism, such as a lockable gas spring, which may be released to decouple the leg rest 9 from the seat pan 6.

The invention claimed is:

1. An aircraft seat, comprising:
   a seat chassis;
   a seat assembly comprising a seat pan, a seat back, and a leg rest;
   the seat pan being mounted to the seat chassis by a first pivoting connection defining a seat pan pivot axis about which the seat pan pivots, the location of the seat pan pivot axis being fixed relative to the seat chassis;
   the leg rest being mounted to said seat pan by a pivoting connection defining a leg rest pivot axis about which the leg rest pivots;
   at least one seat pan link for controlling pivoting of the seat pan about said seat pan pivot axis; and
   at least one leg rest track;
   at least one leg rest follower adapted to travel in said at least one leg rest track, the at least one leg rest follower being connected to said at least one leg rest link;
   at least one leg rest link connected to the leg rest and the at least one seat pan link; and
   wherein the at least one seat pan link is coupled to the seat pan in front of the seat pan pivot axis.

2. An aircraft seat as claimed in claim 1, wherein the seat chassis comprises:
   at least one seat pan track; and
   at least one seat pan follower adapted to travel in said at least one seat pan track, the at least one seat pan follower being connected to the at least one seat pan link.

3. An aircraft seat as claimed in claim 1, wherein the seat back is mounted to said seat pan by a second pivoting connection, the second pivoting connection defining a seat back pivot axis about which the seat back pivots.

4. An aircraft seat as claimed in claim 3, wherein said seat pan pivot axis is located in front of the seat back pivot axis; and the seat pan pivot axis is located between the seat back pivot axis and a mid-point of the seat pan.

5. An aircraft seat as claimed in claim 3, comprising at least one recline link coupled to the seat back.

6. An aircraft seat as claimed in claim 5, wherein the at least one recline link is connected to the at least one seat pan link.

7. An aircraft seat as claimed in claim 6, wherein the at least one aircraft seat pan link, the at least one recline link, and the at least one leg rest link connect the seat pan, the seat back and the leg rest such that adjusting an incline angle of the seat pan changes a recline angle of the seat back and a deployment angle of the leg rest.

8. An aircraft seat as claimed in claim 1, wherein the leg rest is extendible.

9. An aircraft seat as claimed in claim 1, comprising a leg rest decoupling mechanism operable selectively to decouple the leg rest link from the leg rest.

10. An aircraft seat as claimed in claim 8, wherein the leg rest comprises a base portion and an extending portion, the extending portion being movable relative to the base portion to extend the leg rest.

11. An aircraft seat as claimed in claim 10, wherein the leg rest comprises a cam track and a cam follower for controlling movement of the extending portion.

12. An aircraft seat as claimed in claim 11, wherein the cam follower is disposed on a pivotally mounted arm.

13. An aircraft seat as claimed in claim 11, wherein the cam track comprises at least one recess for retaining the extending portion in an extended position, wherein each recess comprises an aperture for receiving the cam follower to retain the extending portion in the extended position.

14. An aircraft seat as claimed in claim 13, comprising cam follower biasing means for biasing the cam follower into the aperture.

15. An aircraft seat as claimed in claim 10, comprising extending portion biasing means for biasing the extending portion towards the base portion.

16. An aircraft seat as claimed in claim 15, wherein the extending portion biasing means comprises at least one tension gas spring.

17. An aircraft seat as claimed in claim 8, wherein the at least one leg rest link coupled to the leg rest controls extension of the leg rest.

18. An aircraft comprising one or more aircraft seat as claimed in claim 1.

19. An aircraft seat, comprising:
  a seat chassis;
  a seat assembly comprising a seat pan and a seat back;
  the seat pan being mounted to the seat chassis by a first pivoting connection defining a seat pan pivot axis about which the seat pan pivots, the location of the seat pan pivot axis being fixed relative to the seat chassis, the first pivoting connection being configured such that the seat pan can pivot about the seat pan pivot axis without undergoing a related translational movement;
  the seat back being mounted to the seat pan by a second pivoting connection, the second pivoting connection defining a seat back pivot axis about which the seat back pivots, the seat pan pivot axis being positioned in front of the seat back pivot axis; and
  at least one seat pan link for controlling pivoting of the seat pan about said seat pan pivot axis; wherein the at least one seat pan link is coupled to the seat pan in front of the seat pan pivot axis;
  a recline link connected to the seat back and the at least one seat pan link; and
  wherein the seat pan pivot axis is positioned between the seat back pivot axis and a mid-point of the seat pan.

\* \* \* \* \*